(12) United States Patent
Summit

(10) Patent No.: US 10,646,768 B2
(45) Date of Patent: May 12, 2020

(54) VIRTUAL REALITY HAPTIC SYSTEM AND APPARATUS

(71) Applicant: Scott Summit, Mill Valley, CA (US)

(72) Inventor: Scott Summit, Mill Valley, CA (US)

( * ) Notice: Subject to any disclaimer, the term of this patent is extended or adjusted under 35 U.S.C. 154(b) by 0 days.

(21) Appl. No.: 16/095,016

(22) PCT Filed: Apr. 19, 2017

(86) PCT No.: PCT/US2017/028460
§ 371 (c)(1),
(2) Date: Oct. 19, 2018

(87) PCT Pub. No.: WO2017/184785
PCT Pub. Date: Oct. 26, 2017

(65) Prior Publication Data
US 2019/0151741 A1   May 23, 2019

Related U.S. Application Data

(60) Provisional application No. 62/324,519, filed on Apr. 19, 2016.

(51) Int. Cl.
| | |
|---|---|
| *A63B 71/06* | (2006.01) |
| *A63B 69/00* | (2006.01) |
| *A63B 24/00* | (2006.01) |
| *A63B 21/00* | (2006.01) |
| *A63F 13/28* | (2014.01) |
| *A63F 13/90* | (2014.01) |

(52) U.S. Cl.
CPC .... *A63B 71/0622* (2013.01); *A63B 21/00181* (2013.01); *A63B 24/00* (2013.01); *A63B 69/0048* (2013.01); *A63F 13/28* (2014.09); *A63F 13/90* (2014.09); *A63B 2071/0644* (2013.01); *A63F 2300/8082* (2013.01)

(58) Field of Classification Search
CPC ........ G06F 3/011; G06F 3/016; G06T 19/006; A63F 13/28; A63F 13/285; A63F 13/90; A63F 2300/8082; A63B 69/0048; A63B 71/0622; A63B 2071/0636; A63B 2071/0638; A63B 2071/0644; A63B 2071/0655
See application file for complete search history.

(56) References Cited

U.S. PATENT DOCUMENTS

| | | | | |
|---|---|---|---|---|
| 5,577,981 | A * | 11/1996 | Jarvik | A63B 21/154 434/247 |
| 5,580,249 | A * | 12/1996 | Jacobsen | A63B 22/0664 434/11 |
| 5,980,256 | A * | 11/1999 | Carmein | A63B 22/02 434/29 |

(Continued)

*Primary Examiner* — Jeffery A Brier
(74) *Attorney, Agent, or Firm* — Staniford Tomita LLP

(57) ABSTRACT

A virtual reality (VR) system includes a VR display and a VR movement apparatus that includes hand interfaces and foot interfaces that can support the hands and feet of a system user. The VR movement apparatus allow the user's limbs to move in 3-dimensional space that include vertical, lateral, and fore-aft direction movements. A computer running VR software coordinate and synchronizes the VR movement apparatus and the VR display to provide system users with simulated activities in a VR environment.

29 Claims, 22 Drawing Sheets

(56) References Cited

U.S. PATENT DOCUMENTS

| | | | |
|---|---|---|---|
| 2006/0106369 A1* | 5/2006 | Desai | A61B 34/70 606/1 |
| 2007/0171199 A1* | 7/2007 | Gosselin | G06F 3/011 345/156 |
| 2010/0145233 A1* | 6/2010 | Zhang | A61B 5/1124 600/592 |
| 2010/0154233 A1* | 6/2010 | Theurer | B61K 9/08 33/287 |
| 2014/0100491 A1* | 4/2014 | Hu | A61H 3/008 601/27 |
| 2014/0368428 A1* | 12/2014 | Pinault | A63F 13/06 345/156 |
| 2016/0139666 A1* | 5/2016 | Rubin | B25J 11/003 345/633 |

* cited by examiner

VIRTUAL REALITY HAPTIC SYSTEM AND APPARATUS

CROSS REFERENCE TO RELATED APPLICATIONS

This application claims priority to U.S. Provisional Patent Application No. 62/324,519, "Haptic Exercise Robot" filed Apr. 19, 2016 which is hereby incorporated by reference in its entirety.

BACKGROUND

Virtual reality (VR) systems are computer-based systems that provide experiences to a participant acting in a simulated environment that forms a three dimensional virtual world. Most VR systems use a visual headset that allows the user to view and virtually move within a computer generated environment. Some VR system improve upon the visual experience by adding mechanical devices that are coupled to the body of the user to provide tactile forces or resistance to the movement of the users body. However, these types of VR suits are complex mechanical devices that must be worn by the user. What is needed is an improved system that allows a system user to experience physical resistance and feedback but does not require the user to wear mechanical devices.

SUMMARY OF THE INVENTION

A VR system can include a VR movement apparatus that includes hand interfaces and foot interfaces that can support the hands and feet of a system user. The VR movement apparatus allow the user's limbs to move in 3-dimensional space and not only along a vertical vector. Since the user's motion may include vertical (Y direction), lateral (X direction) and/or fore-aft (Z direction) movements, the VR movement apparatus can provide users with simulated real physical activities such as climbing just as they would in a real-world climbing environment.

The VR system can include a VR program that runs on a computer that synchronizes the motion of a user in a VR environment visually through a display and through the VR movement apparatus for a haptic experience. The display can be built into a VR headset, which can include an audio system. The visual signals are coordinated or synchronized with the control signals to the VR movement apparatus so that the visual virtual environment exactly matches with the movement limitations of the hand and feet interfaces of the VR movement apparatus. More specifically, the VR program can display a topographical VR environment that includes virtual objects such as land, mountains, structures, vehicles, etc. The VR software can allow the hand and feet interfaces to move in free space, but can prevent movement through the virtual objects so that the user's movement will stop when virtual contact is made with any virtual structures. These physical objects can be synchronized with the VR visual display so that a user can see and feel the virtual objects, in order to maintain the VR illusion.

In different embodiments, the VR system can be used to simulate various physical activities such as: walking, running, climbing, skating, skiing, snowboarding, driving, cycling, swimming, rowing, windsurfing, water skiing, wake boarding, kite boarding, etc. The VR machine can also provide a means for: training simulations, physical therapy, physical exercise, etc. The VR system can be a safe way to train in simulated environments for hazardous activities such as: rock climbing, skydiving, paragliding, extreme skiing, etc. The inventive VR system can be used in: gyms, health clubs, hotels, and other locations where one might find gym or experience devices.

DETAILED DESCRIPTION

Figure 1:
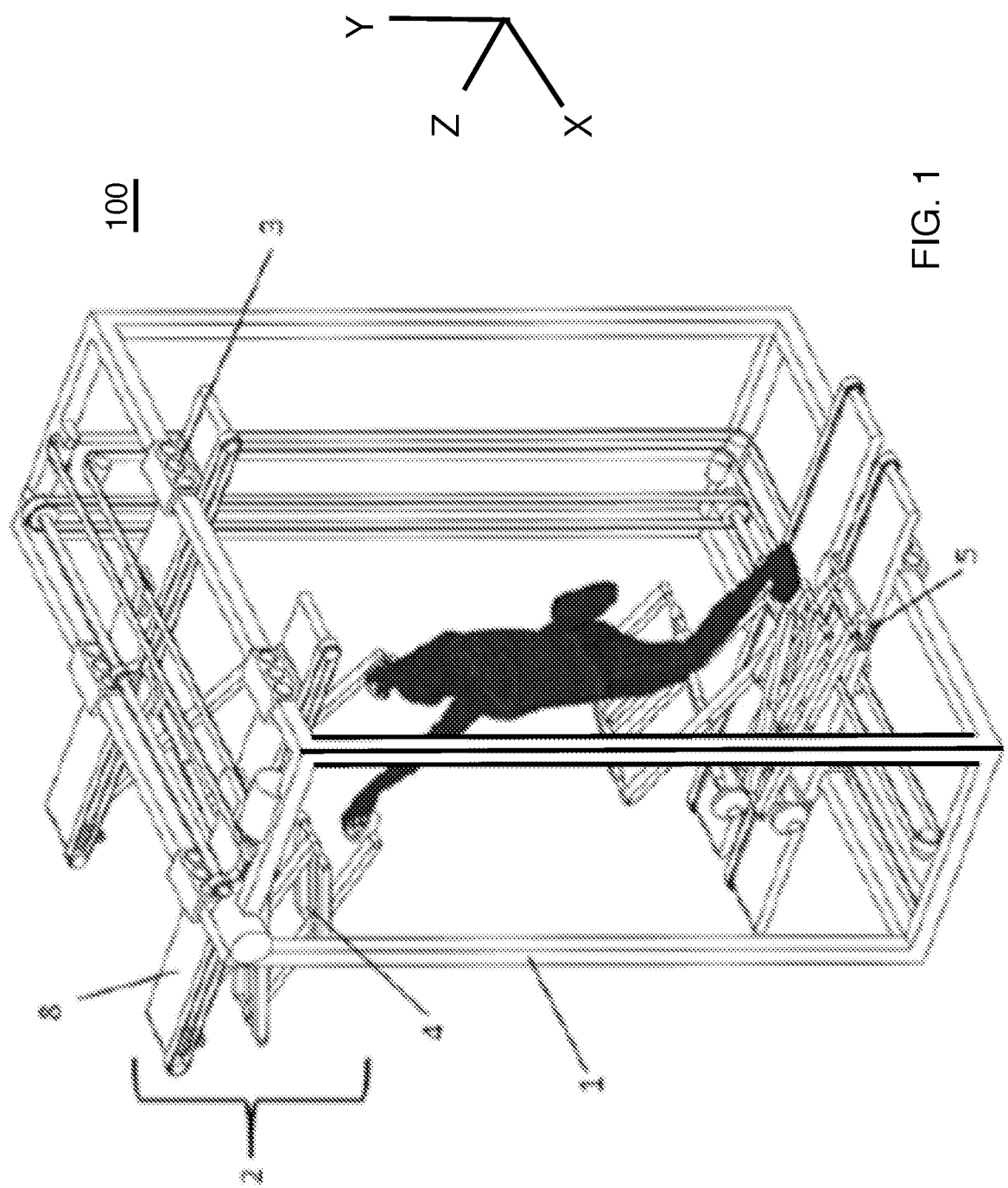
FIG. 1 illustrates a perspective view of an embodiment of a VR movement apparatus with a user.

The present invention is directed towards a VR system that simulates visual and physical interaction with a digital, three-dimensional, VR environment. The inventive VR system can include a headset and a mechanical VR device that can support the user. A computer generated VR three dimensional (3D) environment can be seen by a user through the VR headset and the visual VR environment can be creating a 'haptic robot' movement apparatus that coordinates a physically simulated force felt by the user with the expected physical force that would exist in the VR environment. The result is an experience that deceives both the vision and the physical interaction, as felt by hands and feet and, by extension the user's arms, back, legs, core muscles, etc. By adding the bodily forces, the inventive VR system can create a more complete sensation of VR immersion. The user 'sees' a stereoscopically and spatially feels an accurate facsimile of a VR world about them. As the user interacts within the VR environment, the user would 'feel' a simulated, physical response from such interaction.

For example, in an embodiment a user might choose to virtually climb a structure such as the Eiffel Tower. Visually, they would use the headset to 'see' an accurate facsimile of the Tower, along with Paris in the background, complete with atmospheric haze, clouds, etc. In the foreground, the user would see their digitally created hands moving within their field of vision, reaching to grip a spar, or pulling down as they ascend. The user would be in physical contact with a haptic VR exercise apparatus. Physically, the user's hands and feet would move relative to each other and relative to the virtual environment with the expected physical resistance as seen in the VR headset, as if they were actually climbing upward. In an embodiment, the machine does not provide resistance to upward movement. Gravity can be used to re-center the user as the user ascends so that the system user is moving in place. In a running application, the VR environment can be an incline. The system user can move the legs in a running motion in the VR environment and the VR movement apparatus can re-center the user using gravitational forces so the user is actually running in place. Similarly, if the user is in a mountain climbing VR environment, the VR movement apparatus can re-center the user using gravitational forces so the user is climbing in place.

In other embodiments, a user may use the inventive VR system to virtually experience various other types of activities for play, medical purposes, fantasy, escape, entertainment, fitness, training, etc. Such VR simulations could be designed to for various purposes such as: burning calories, working specific muscle groups, rehabilitating specific areas of focus, developing muscle memory, etc. Since a digital controller drives the entire process, each motion could be stored and analyzed for the effectiveness of the overall routine. This would in turn, offer accurate physical activity compliance monitoring or physical therapy progress information for a patient that can be provided to a doctor. In other embodiments, the inventive VR system can be used for other purposes such as client training monitoring for a coach or personal trainer.

With reference to FIG. 1, an embodiment of a VR exercise apparatus 100 is illustrated which can include a rigid frame 1 that can hold all members of the assembly. In an embodiment, the frame 1 can includes four identical armature assemblies 2 that can be mounted on linear bearings 3 that can slide on the frame 1. The movement of the armature assemblies 2 can be described with reference to an XYZ coordinate system. The linear bearings 3 can allow the armature assemblies 2 to slide laterally in the X direction on the frame 1 with minimal friction. The armature assemblies 2 can include scissor jack mechanisms 4 that are coupled to carriages 8 attached to the linear bearings 3. The carriages 8 can allow the scissor jack mechanisms 4 to move in the Y direction relative to the frame 1. The scissor jack mechanisms 4 can each have a proximal portion that is coupled to the carriages 8 and distal ends which can have user interface mechanisms. The scissor jack mechanisms 4 expand and contract in the Y direction relative to the frame 1. The user can interact with the distal ends of four scissor jack mechanisms 4. The distal ends of the scissor jack mechanisms 4 can be coupled to: a left hand interface, a right hand interface, a left foot interface and a right foot interface which can move to any X, Y, Z position in a 3 dimensional space defined by the frame 1. In an embodiment, the frame 1 can define an X-Y "movement perimeter" and the left hand interface, the right hand interface, the left foot interface and the right foot interface can move within the X-Y movement perimeter. In the illustrated example, the left hand interface, the right hand interface, the left foot interface, the right foot interface and the user 20 may be outside the Z perimeter plane of the frame 1.

Figure 2:
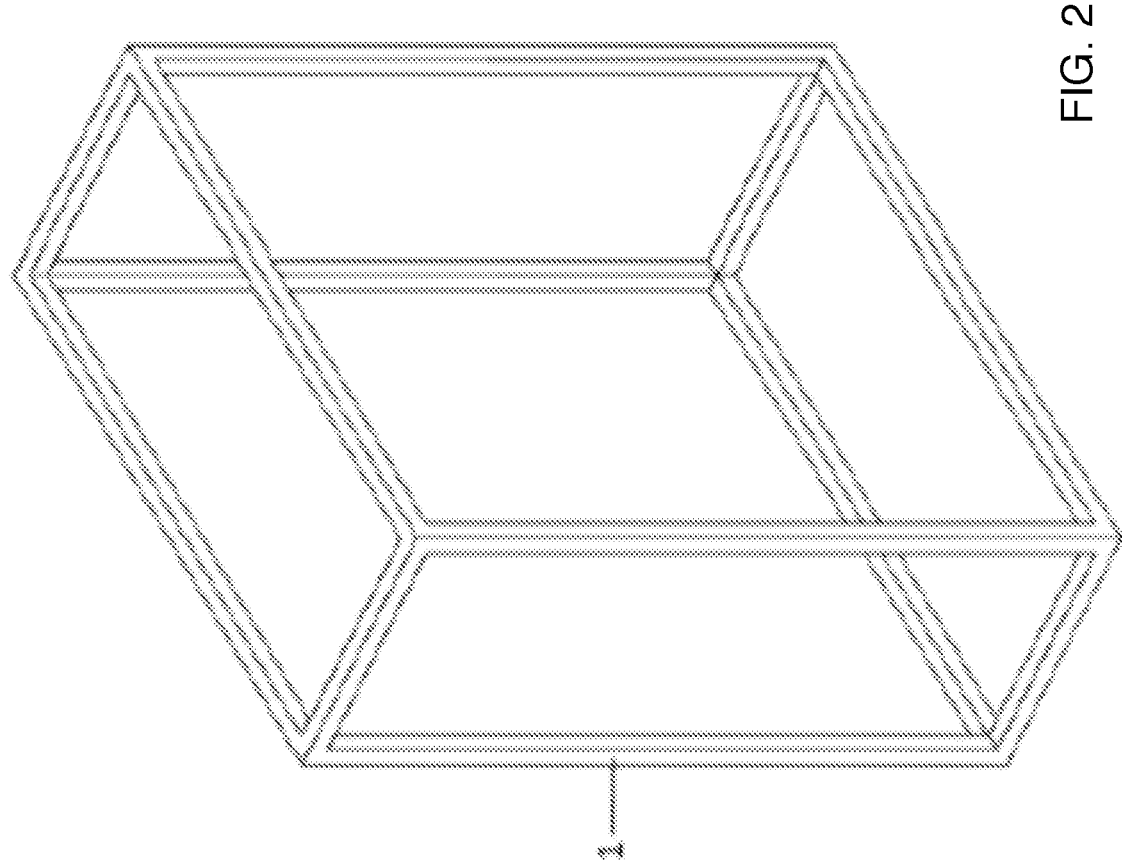
FIG. 2 illustrates a perspective view of an embodiment of a frame of a VR movement apparatus.

With reference to FIG. 2, an embodiment of a rigid frame 1 is illustrated. The frame 1 provides a support structure for the haptic apparatus and can be made of a plurality of straight sections of tubing which can have a uniform cross section such as: square, rectangular, circular, or any other suitable cross section. The tubes can function as tracks for the linear bearings. In another embodiment, the frame 1 may be used as a rigid structure on which linear bearing slides and tracks are mounted. In the illustrated embodiments, frame 1 is a 3D box that has parallel tubes extending the X, Y and Z directions to define a movement space within the apparatus. The linear bearings can slide over the outer surfaces of the tubes. In other embodiments, the tubes may have slots and the linear bearings may slide on inner surfaces of the tubes.

Figure 3:
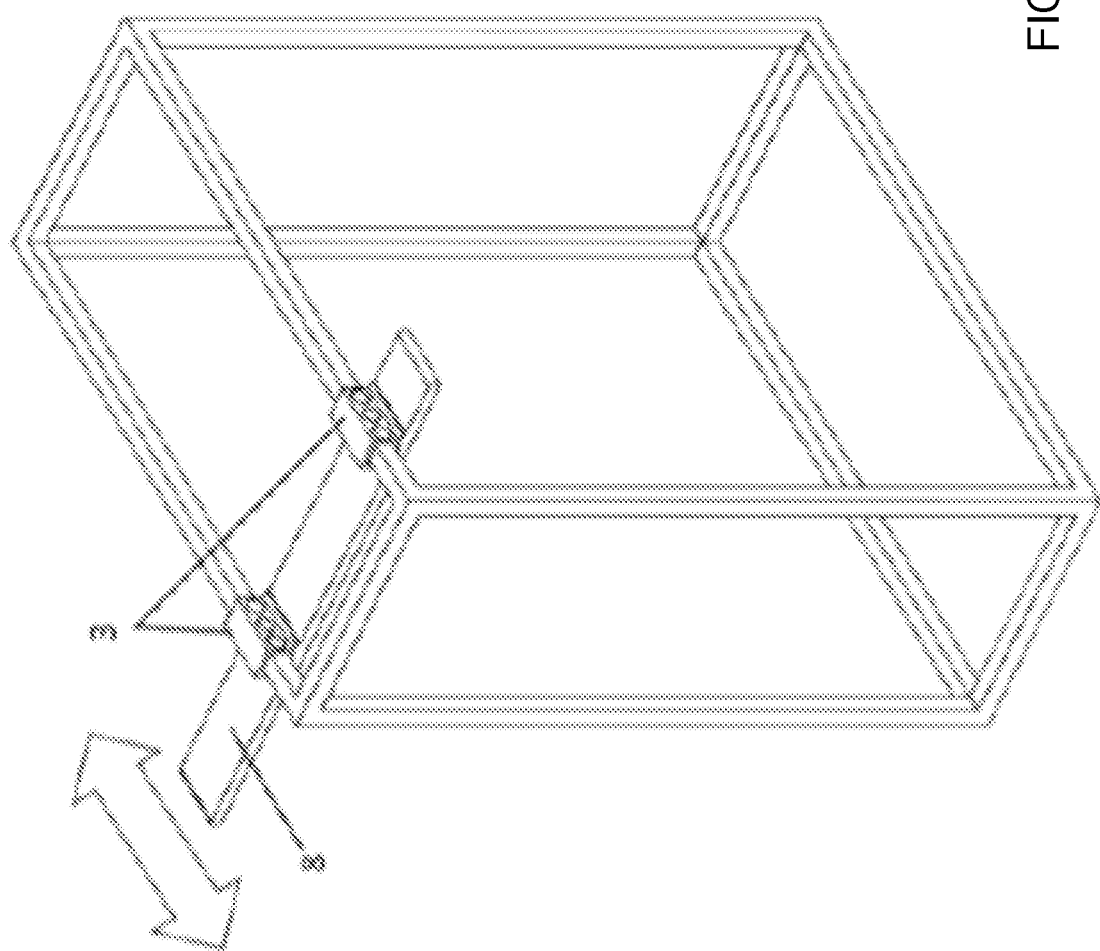
FIG. 3 illustrates a perspective view of an embodiment of a frame and a carriage of a VR movement apparatus.

With reference to FIG. 3, an embodiment of an upper left carriage 8 is coupled to linear bearings 3 which allow the upper left carriage to slide laterally along the upper lateral tracks of the frame 1 with minimal friction. Only one carriage 8 has been shown here for clarity. The linear bearings 3 allow the carriage 8 to move in the X direction.

Figure 4:
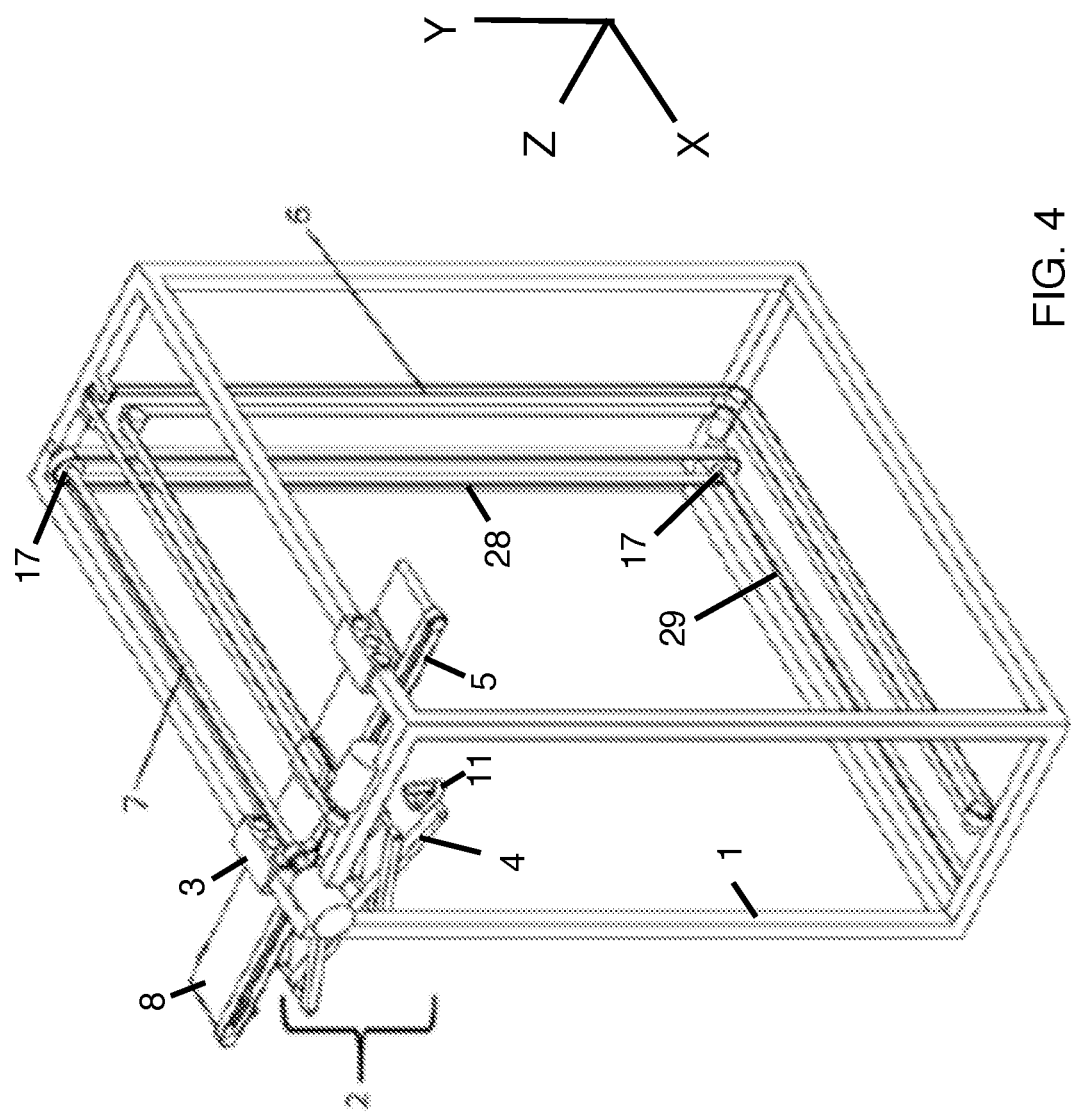
FIGS. 4-6 illustrate perspective views of an embodiment of a frame, carriage and scissor jack mechanism of a VR movement apparatus.

With reference to FIG. 4, an embodiment of a scissor jack mechanism 4 is illustrated with the upper left carriage 8 and the frame 1. The scissor jack mechanism 4 is coupled to the carriage 8 with additional linear bearings that allow the scissor jack mechanism 4 to move in the Z direction relative to the frame 1. The scissor jack mechanism 4 can extend and contract to adjust the vertical position of a distal end. The distal ends of the scissor jack mechanism 4 can include hand or foot connections. Clamp and linear bearing assembly 5 controls fore-aft motion, while the scissor jack mechanism 4 can include a computer controlled brake that regulates the gravity-driven descent of an end effector IL The computer can monitor the component movement and makes sure that all the end effectors 11 move at the same pace during re-centering movements. When 'vertical motion only' is happening, then the brake 4 is regulating its motion toward the proximal end (for the hands, opposite for the feet). Thus, the scissor jack mechanism 4 can control the vertical Y direction location of the user and the vertical movements of the user. The linear bearings 3, carriage 8 and scissor jack mechanism 4 of the haptic apparatus, link all of the user's three-dimensional motions.

In addition to providing 3D movement, the haptic apparatus, can be configured to prevent or resist movement of the distal ends of the scissor jack mechanisms 2, in order to simulate a haptic 3D VR environment. In the illustrated embodiment, the movement of the carriage 8 and scissor jack mechanism 2 are controlled using a plurality of timing belts 6 and shafts 7 coupled to gears 17 that can control the motion of all moving components in the haptic apparatus. The timing belts 6 can include teeth that engage the teeth on gears. The downward motion of the linked scissor jack mechanism 2 can result from gravitational pull on the distal ends by a user. This downward movement can be regulated by electric motors or brakes controlled by the microprocessor. Timing belts 5 and spline gears 17 and shafts 7 link all lateral and fore-aft motions of the foot and hand couplings at the distal ends of the scissor jack mechanism 2. This forces the motion vector of all four end effectors to be identical and synchronized. In an embodiment, the four end effectors can be a left hand interface, a right hand interface, a left foot interface and a right foot interface.

Figure 5:
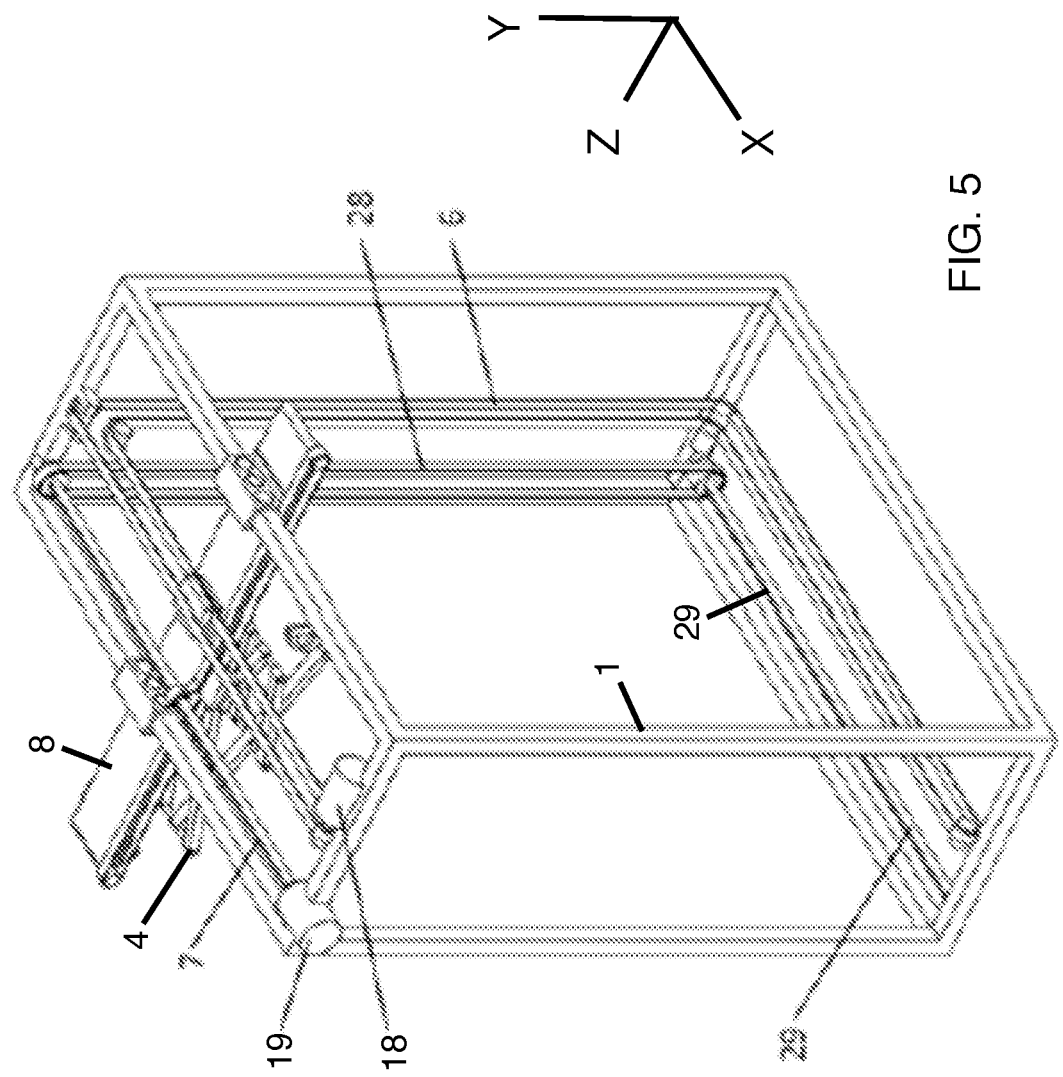

With reference to FIG. 5, the fore-aft motion and lateral motion of the scissor jack mechanisms 4 can be controlled by a fore-aft control motor 19 and a lateral control motor 18, respectively. The lateral control motor 18 can drive a first timing belt 6 that connects all four carriages 8 of the haptic system, when engaged, in a single synchronized motion in the same direction. The fore-aft control motor 19 can be connected to a splined gear 17 which drives a splined shaft 7, which when rotated can move all four scissor jack mechanisms 2 forward simultaneously in the Z direction. When fore-aft control motor 19 rotates in the opposite direction, the reverse movement of the splined gear 17 and splined shaft 7 can move all four scissor jack mechanisms 2 rearward simultaneously. The splined gear 17 and the shaft 7 at the top of the frame 1 and another shaft 29 at the base of the frame 1 are connected with a timing belt 28, forcing simultaneous motion between the upper and lower scissor jack mechanisms 2.

Figure 6:
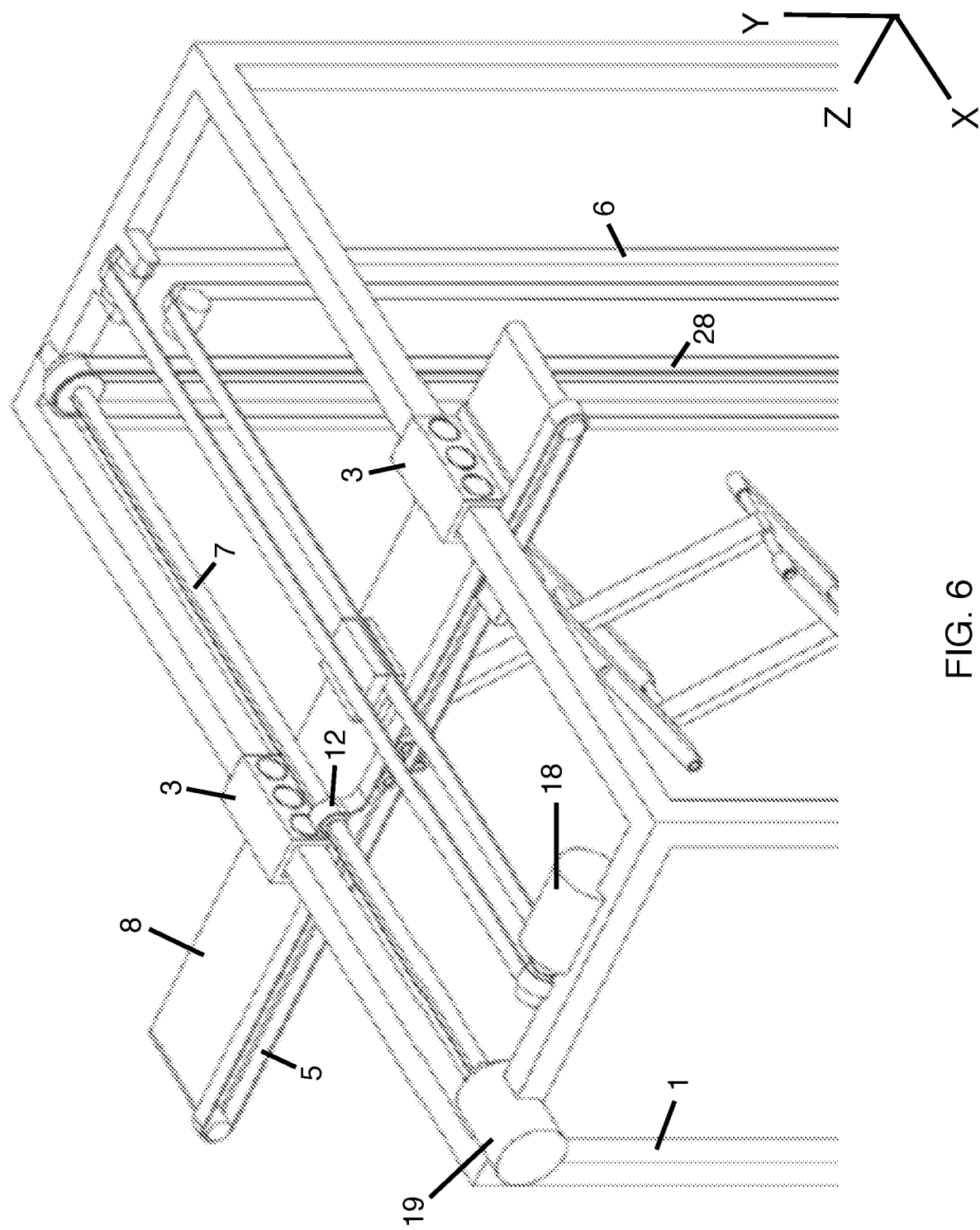

FIG. 6 illustrates a close up perspective view of the haptic apparatus. In this embodiment, the fore-aft control motor 19 can be directly coupled to the splined shaft 7, which extends across the width of the frame 1. The gear 17 is mounted on the opposite end of the splined shaft 7 and a belt 28 surrounds the gear 17 and extends down on the right side of the frame 1 to control the rotation of another splined shaft 29 that extends across the bottom edge width of the frame 1. A sliding shaft gear 12 can be mounted around the splined shaft 7 that can slide along the length and also rotate with the splined shaft 7. The sliding shaft gear 12 is mounted on the carriage 8 and controls the movement of the scissor jack mechanism 4 in the Z direction relative to the carriage 8. The splined shaft 17 can rotate a gear that controls the fore-aft movement of the carriage 8 can also include a belt which controls the fore-aft movement of the scissor jack mechanisms 2 relative to the carriages 8 in the Z direction.

The lateral control motor 18 is coupled to a gear which controls the movements of the belt 6 which extends across the upper width of the frame 1 and then bends extends downward long the right side of the frame 1 and the bottom horizontal surface of the frame 1. The belt 6 the carriages 8 can be coupled to the belt so that movement of the belt in a first direction can cause the carriages 8 move to the right and movement of the belt 6 in the opposite direction can cause the carriages 8 to move of the left relative to the frame 1.

Figure 7:
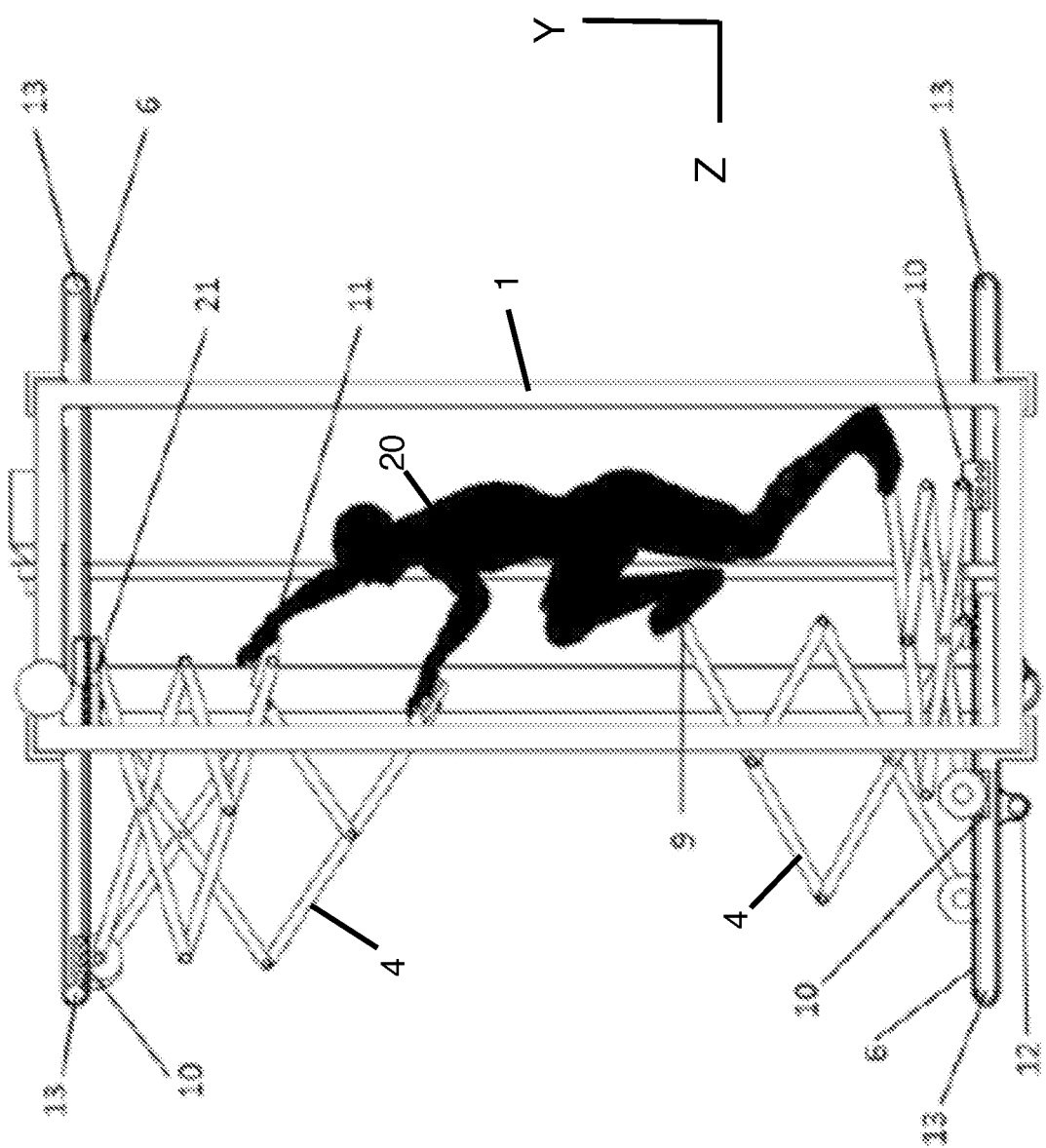
FIG. 7 illustrates a side view of an embodiment of a VR movement apparatus with a user.

FIG. 7 illustrates a left side orthogonal view of an embodiment of the inventive VR movement apparatus. The user 20 holds grips on end effectors 11 with the hands. The end effectors 11 can be a left hand interface and a right hand interface that can be grasped by the user's left and right hands. The user's feet can be affixed to the left foot interface and the right foot interface at the distal ends of the leg scissor jack mechanisms with bindings similar to bicycle bindings or straps across the top of the feet 9. The scissor jack mechanisms slide fore and aft in the Z direction on linear bearings 10.

The bearings 10, carriages and scissor jack mechanisms can move freely when in a 'free motion' state. However, when the user virtually 'grips' a virtual structure through one or both of the end effectors 11, the computer controlled motors and brakes can be actuated to stop further movement to simulate user contact with a VR object. The connected scissor jack mechanism(s) 4 and carriage(s) 2 immediately affix rigidly to their respective specific timing belts 6 by means of a belt-clamps 21 when controlled by the computer to simulate contact with a VR object. At such a VR contact point, some or all of the scissor jack mechanisms 4 can hold the user 20 in a fixed position. If the VR software running on the computer indicates that re-centering is necessary and all of the scissor jack mechanisms 4 can hold the user 20 in a fixed position, the scissor jack mechanisms 4 may move in unison to re-center the user 20 within the movement perimeter of the frame 1. During the re-centering process, the computer can move all of the end effectors 11 in the same relative positions while centering the end effectors 11 within movement perimeter of space as defined by the frame 1.

Each carriage 8 can include is a sliding shaft gear 12 that couples with the fore-aft timing belts 6 mounted to the carriage 8. This sliding shaft gear 12 is keyed to a spline shaft (not shown in this view), allowing all belts to move simultaneously. Freely-spinning Pulleys 13 are mounted to the opposite ends of the carriage 8 so that the fore-aft timing belt 6 forms a tight loop. The movement of the timing belt 6 causes the scissor jack mechanisms 4 to move in the Z direction.

Figure 8:
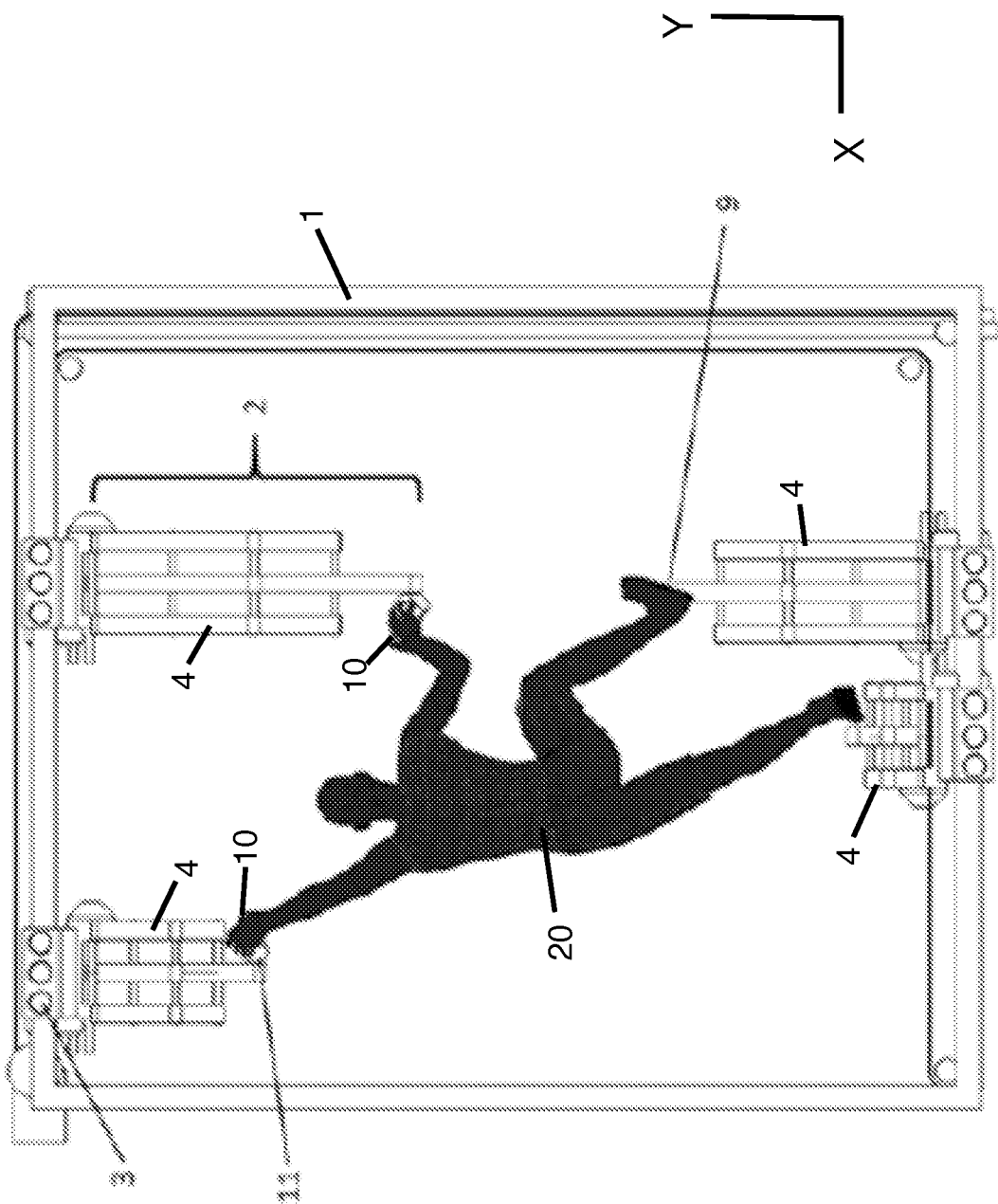
FIG. 8 illustrates a front view of an embodiment of a VR movement apparatus with a user.

FIG. 8 illustrates a rear orthogonal elevation view of an embodiment of the VR apparatus. With the belt-clamps in 'released' states, the four armature assemblies 2 can slide freely in a lateral motion as the linear bearings 3 slide on the frame 1 in the X direction in order to minimize friction. The fore-aft motions (Z direction) and upward-downward (Y direction) motions are similarly free to allow user 20 movement in 'released' state. The user 20 contacts the invention at the end effectors 11 at the hands 10 and feet 9. Since all downward forces are linked using the timing belts and spline shafts, the cumulative downward pressure always can equal the user's total body weight. When the belt-clamps are engaged, some or all of the four scissor jack mechanisms 4 can remain in fixed states, simulating a solid structure to the user's hands and feet. This is reinforced by the visual confirmation of an unmoving structure generated by a computer and seen in the VR headset or other visual display.

When the belt-clamps are engaged and the VR machine needs to re-center the user, all four scissor jack mechanisms 4 can move in X, Y and Z directions—vertical, lateral, fore-aft as needed, in a synchronized motion, in order to return the user 20 to the center of the frame 1 of the machine, preventing the scissor jack mechanisms 4 from moving out of or in contact with a movement perimeter of the VR machine.

Figure 9:
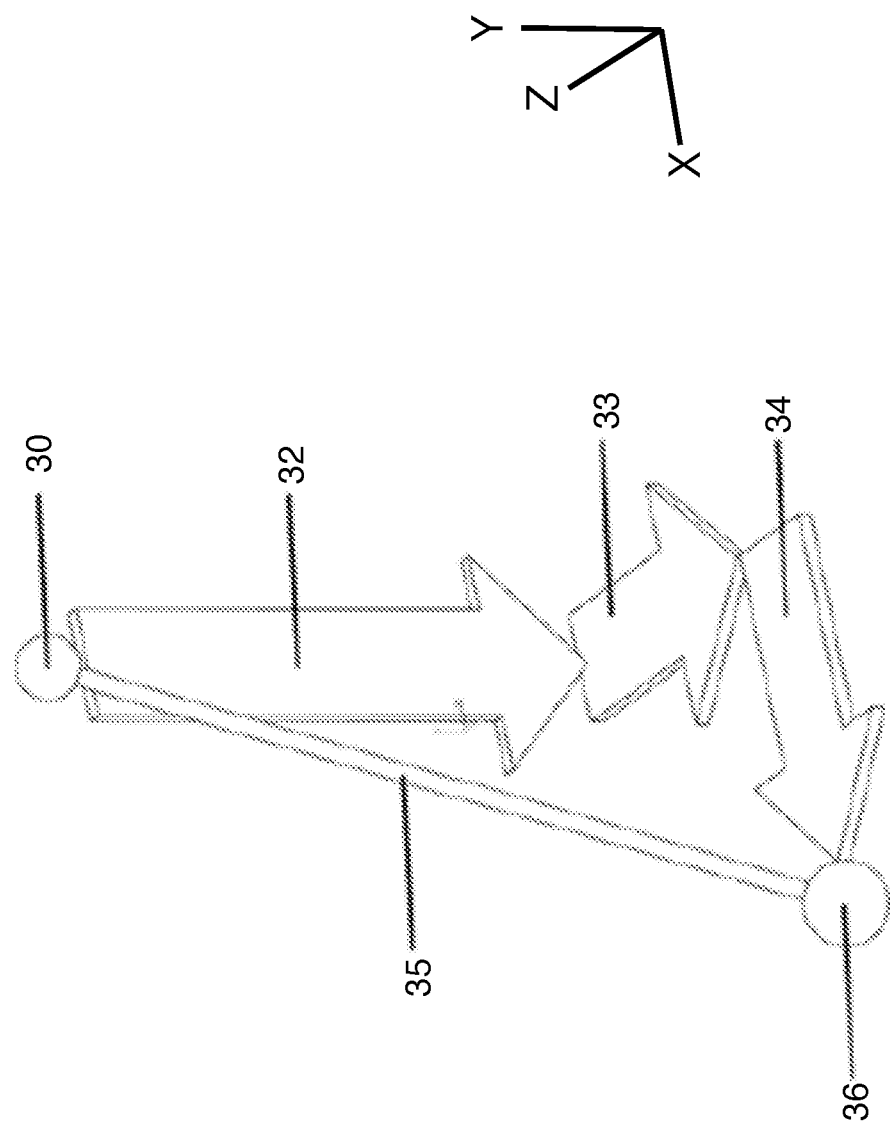
FIG. 9 illustrates an X, Y, and Z direction coordinate force diagram.

With reference to FIG. 9, a plurality of X direction, Y direction and Z direction motion vectors are illustrated. In order to create controlled, deliberate re-centering of the user's body as they 'climb' in place, the scissor jack mechanisms move in a synchronized manner and elongate or contract, move fore and aft, and move laterally. A combination of downward motion 32 and fore-aft motion 33 and lateral motion 34 determines the overall vector 35 of the end effector as it is re-centered from starting location 30 to final position 36. A microprocessor controls the motors and brakes in order to move the end effector along the chosen vector 35.

The velocity of each cartesian vector accelerates and decelerates, in order to minimize the sensation of motion to the user. This velocity may take the form of a spline curve. Since there exist three motions: negative Y movement 32, negative Z movement 33 and positive X movement 14, the top speed may be different for the X movement, Y movement and Z movement, so that they all reach the final position 36 at precisely the same time. In this example, the Y movement 32 is greater than the Z movement 13 or the X movement 34. Therefore the speed of the Y movement 32 will be greater than the speed of the Z movement 13 or the X movement 34. This assures that the motion from the start location 10 to the finish position 36 feels like a straight line to the user.

Figure 10:
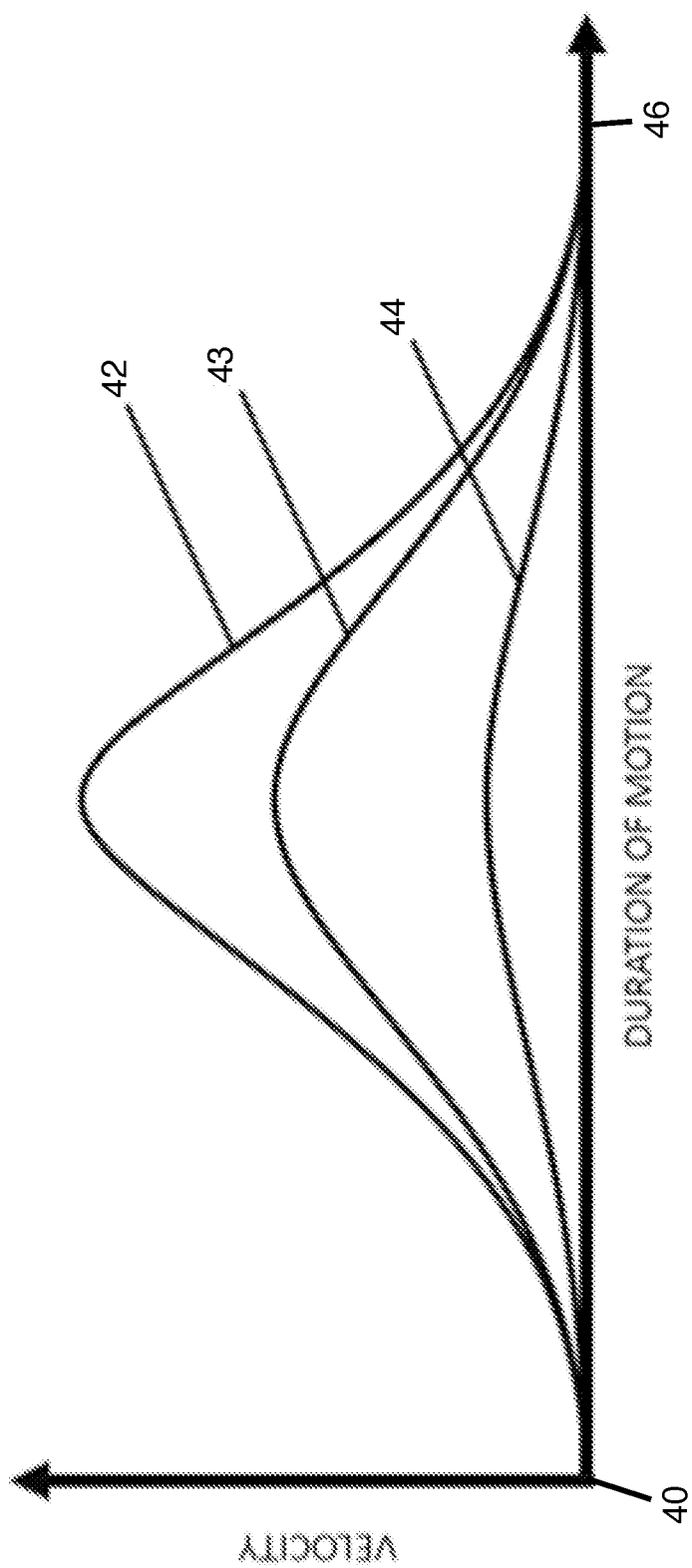
FIG. 10 illustrates an X, Y, and Z direction acceleration graph.

With reference to FIG. 10, a graph illustrating the velocity of the end effector in the X, Y and Z directions over the duration of the motion between the start of the motion 40 at the beginning position and the end of the motion 46 at the final position is illustrated. The X direction velocity 44, Y direction velocity 43 and Z direction velocity 42 all start and finish with very low velocities. However, the X direction velocity 44, Y direction velocity 43 and Z direction velocity 42 all increase to a maximum velocity at the middle of the motion duration and then slow down prior to reaching the end of motion 46 at the final position. Because the motion has a longer vertical travel, the Y velocity 42 is greater than the X velocity 44 or the Z velocity 43. The Z distance and Z velocity 43 is greater than the X distance or X velocity 44. The slow velocities at the starting of the motion 40 and ending of the motion 46 help to minimize the acceleration that can be easily detected so that re-centering is not less detectable by the system user.

Figure 11:
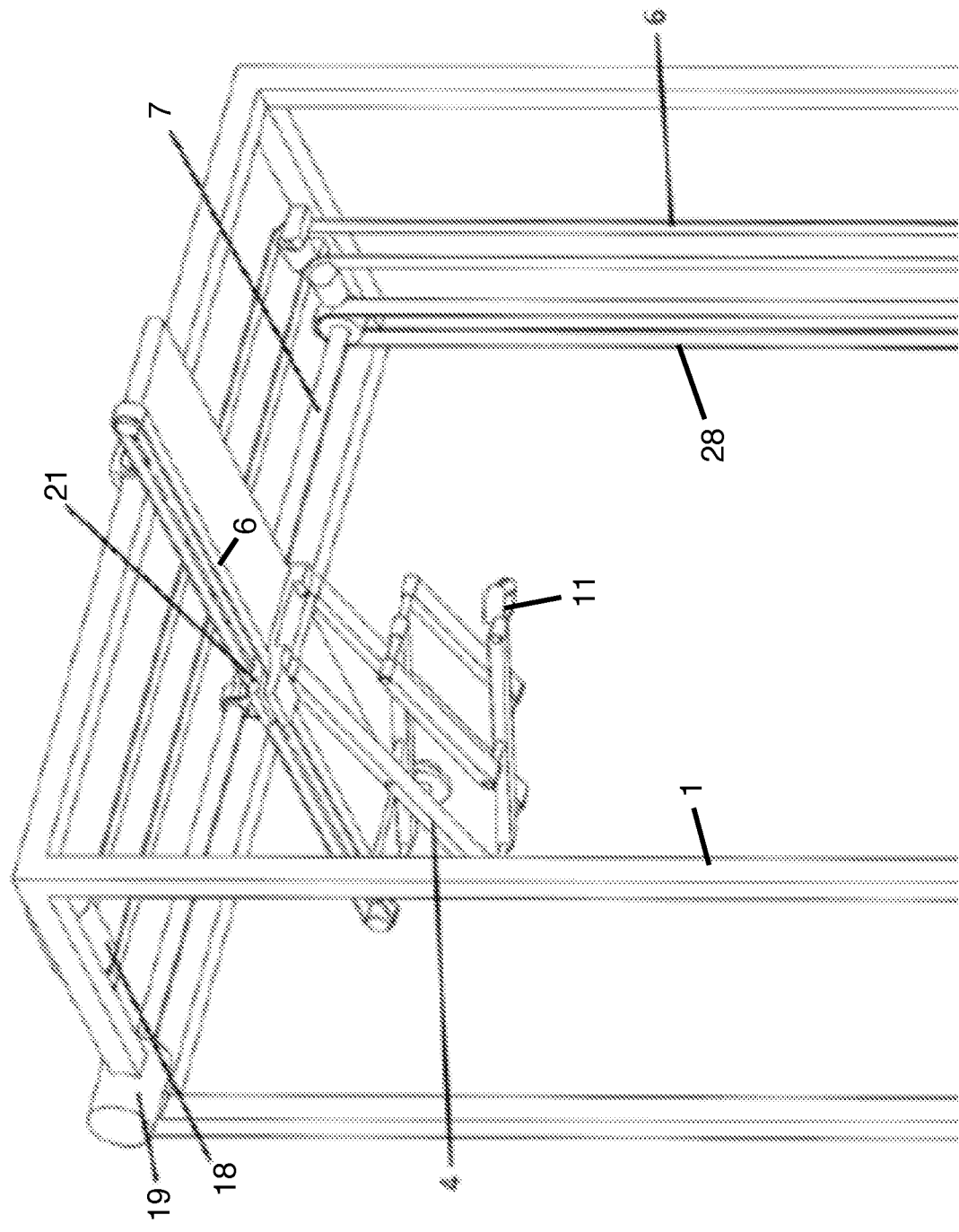
FIGS. 11-12 illustrate perspective views of an embodiment of a VR movement apparatus illustrating movements of the frame, carriage and scissor jack mechanism.

With reference to FIG. 11 a simplified embodiment of a single armature assembly 2 is illustrated in an off centered position. In this embodiment, the armature assembly 2 includes: a scissor jack mechanism 4, belts 6, lateral motion control motor 18, fore-aft motion control motor 19, and a fore-aft belt clamp 21 that is computer controlled. A timing belt 6 can be connected to the upper spline shaft 7 with the lower splined shaft (not shown), in order to connect all fore-aft motion into synchronicity. When the fore-aft motion control motor 19 rotates the splined shafts 7, the sliding gears 17 can rotate and move fore-aft belt along the carriage 8. The scissor jack mechanisms 4 can move in the Z direction relative to the carriage 8 and frame 1. When the motor 18 rotates, the carriage 8 and scissor jack mechanisms 4 can move in the X direction relative to the frame 1. The scissor jack mechanism 4 has two proximal ends, which are coupled to the fore-aft timing belt 5. When the clamp 21 is released, the distal end effector 11 can move freely vertically in the Y direction and then the clamp 21 is actuated, the end effector 11 can be locked in place preventing movement in the Y direction.

Figure 12:
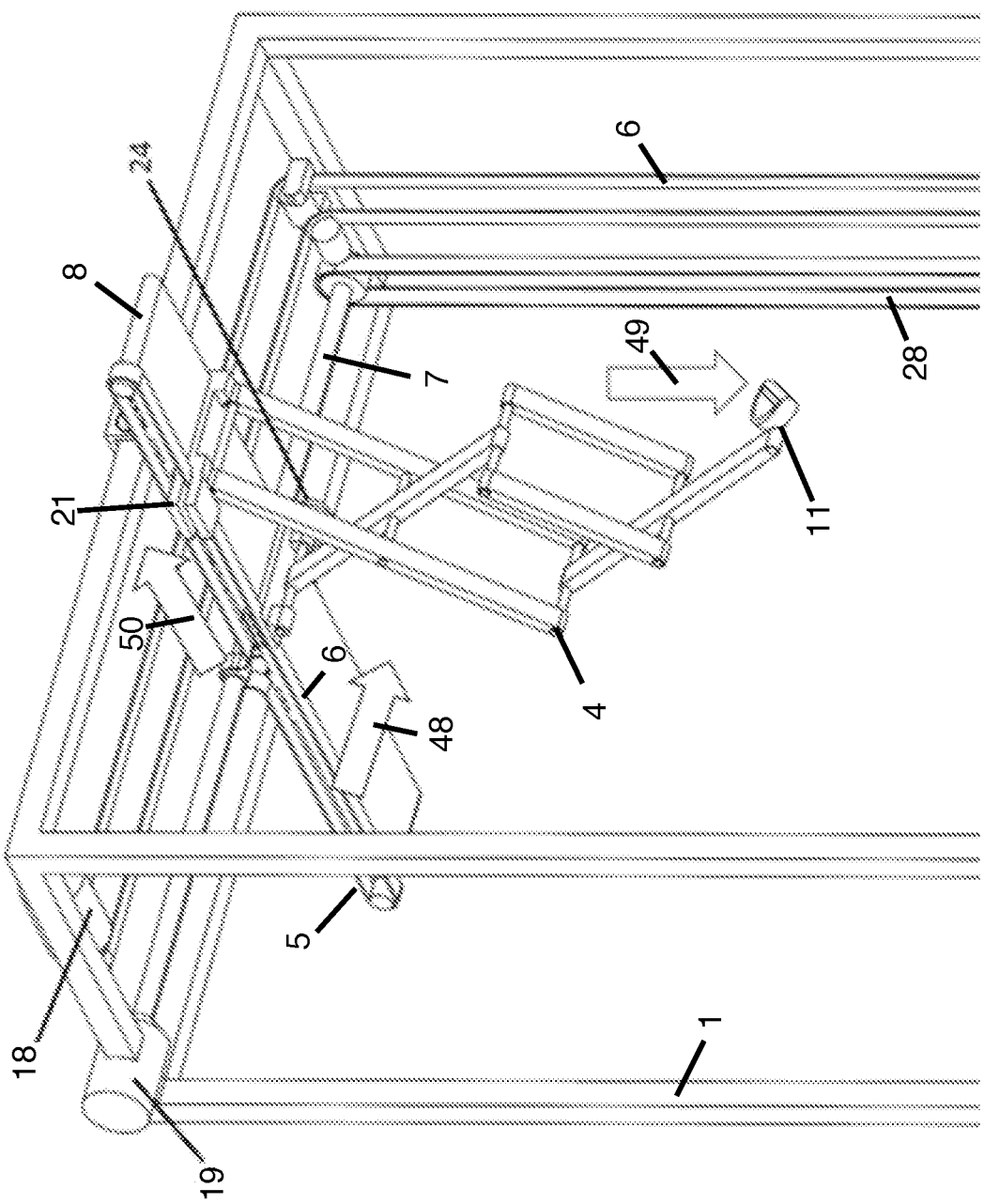

With reference to FIG. 12, a simplified embodiment of a single armature assembly 2 is illustrated moving from an off centered position to a centered position. When re-centering the user's lowest foot once the software has 'decided' the correct motion vector, the lateral motion control motor 18 and the fore-aft motion control motor 19 relocate the end effector along the horizontal motion plane. Simultaneously, the descent motion controller 24 regulates the downward motion of the end effector 11. In one embodiment, the descent motion controller 24 is an electric motor. In another embodiment, the descent motion controller 24 is a mechanical brake, able to regulate motion by creating specified resistance. All motions are designed to move the end effector 11 along the chosen vector so that their start and stop times are synchronous, regardless of distance. The clamp 21 can be modulated to control the vertical movement rate of the end effector 11. In the illustrated example, the re-centering movement of the end effector 11 (from the position illustrated in FIG. 11) includes the following movements: negative X direction 48, negative Y direction 49 and negative Z direction 50. In doing so, the three-dimensional vectors will follow a straight path and variable velocity pattern as discussed above with reference to FIGS. 9 and 10.

Figure 13:
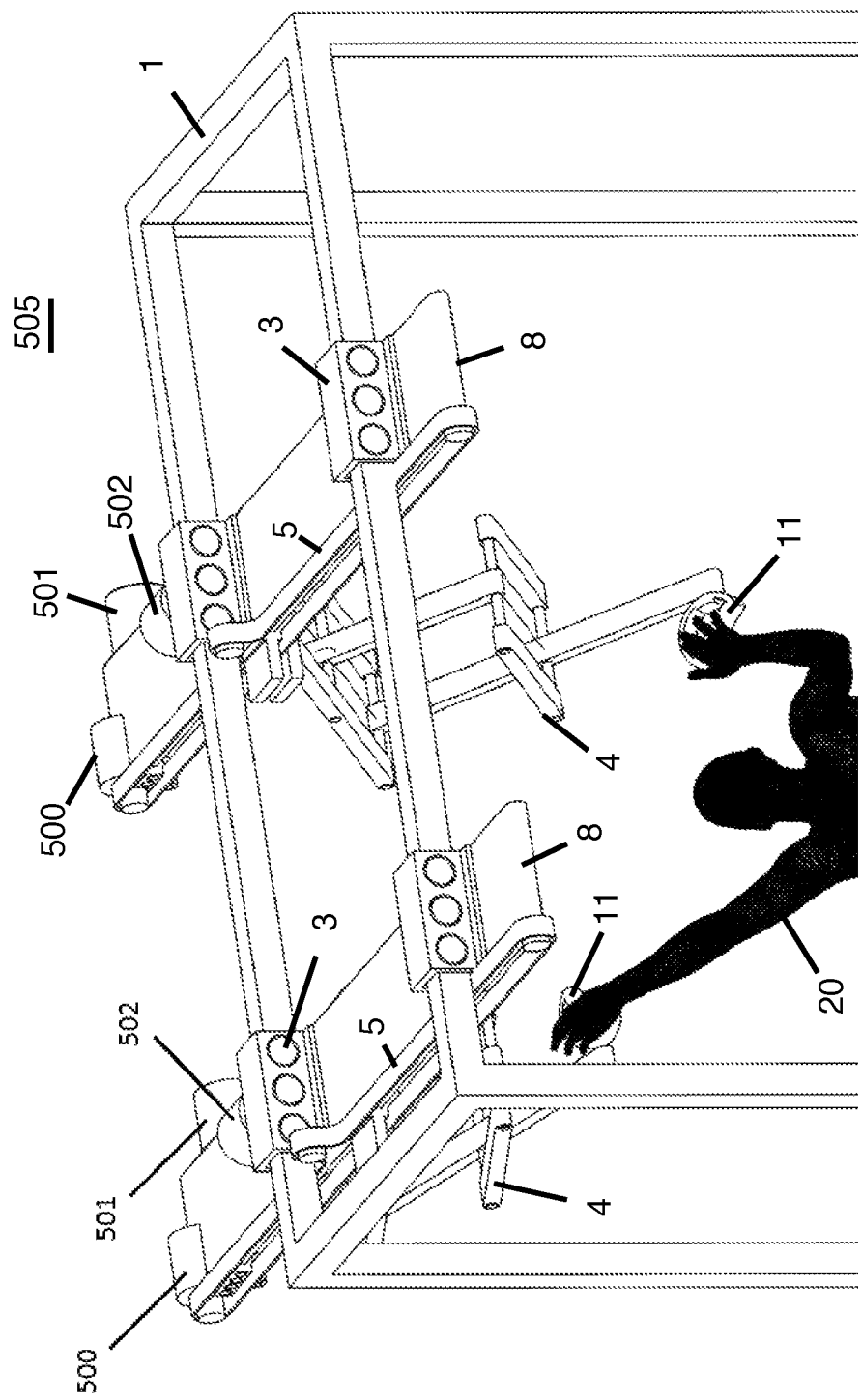
FIGS. 13-15 illustrate front views of a user's movements on an embodiment on a VR movement apparatus.
Figure 14:
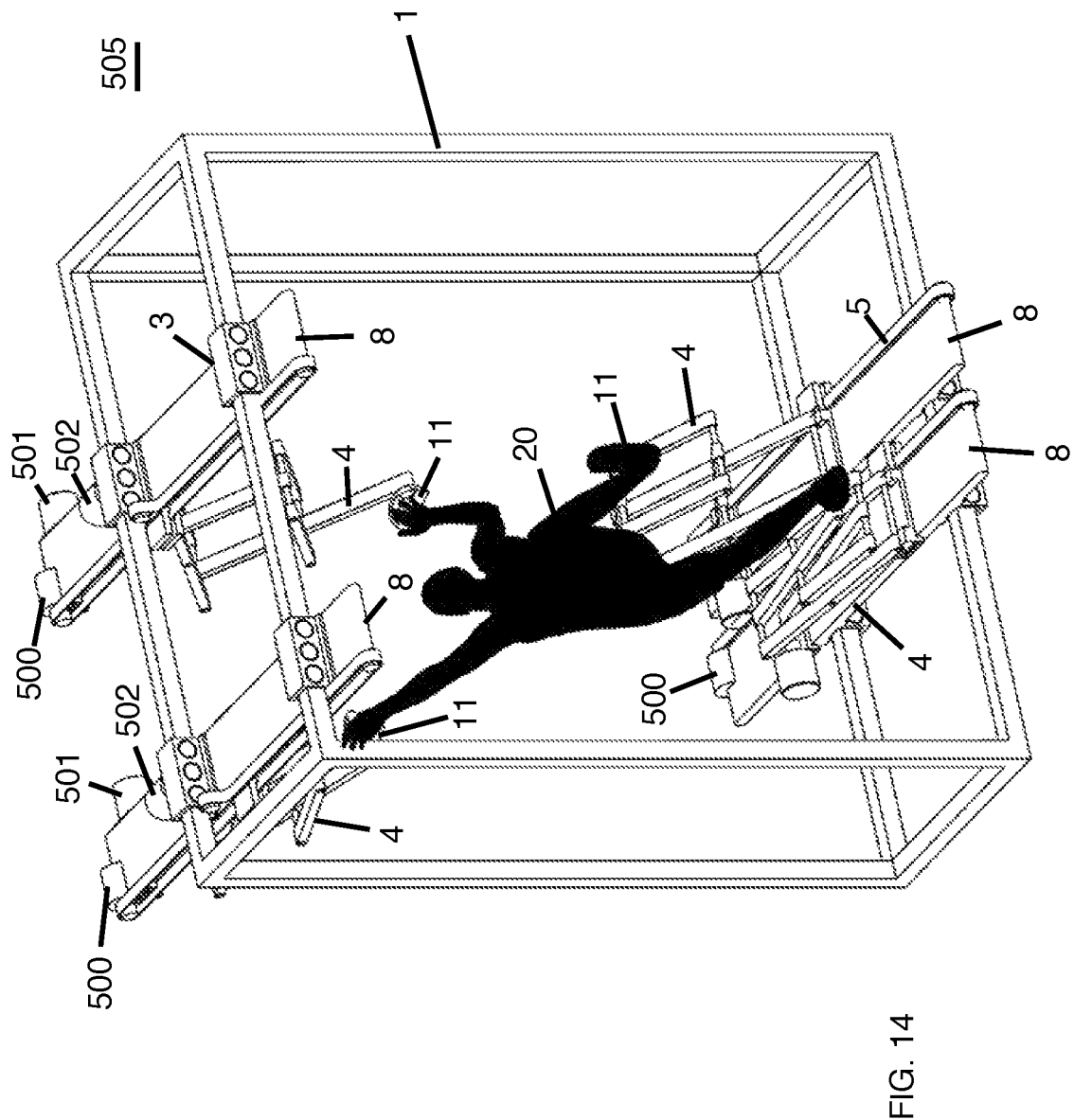

In FIGS. 1-12 an embodiment of a VR movement apparatus was illustrated that used belts, gears and shafts to perform the re-centering movement of the end effectors 11. In other embodiments, other mechanisms can be used to control and restrict the movement of the end effectors 11. In an embodiment with reference to FIGS. 13 and 14, motors 500, 501, 502 can be used to with the VR movement apparatus 505. FIG. 13 illustrates a perspective view of a top portion of a VR movement apparatus 505 and FIG. 14 illustrates a perspective view of an entire VR movement apparatus 505. In this embodiment, the vertical motion of the end effector 11 can be controlled by a vertical control motor 500, the fore-aft motion of the end effector 11 can be controlled by a for-aft motor 501 and the lateral movement of the end effector 11 can be control by a lateral motor 502. The motors 500, 501, 502 can be controlled by a computer processor that allows free movement of the end effector 11 in virtual free space and prevents movement of the end effectors 11 through any virtual solid objects. In an embodiment, the motors 500, 501, 502 can be stepper motors that can also provide location information for the end effectors 11 in the X, Y and Z directions. The motors can be energized to resist rotation and movement of the end effectors 11 when the end effectors 11 are determined to be in contact with a surface of a VR object.

Figure 15:
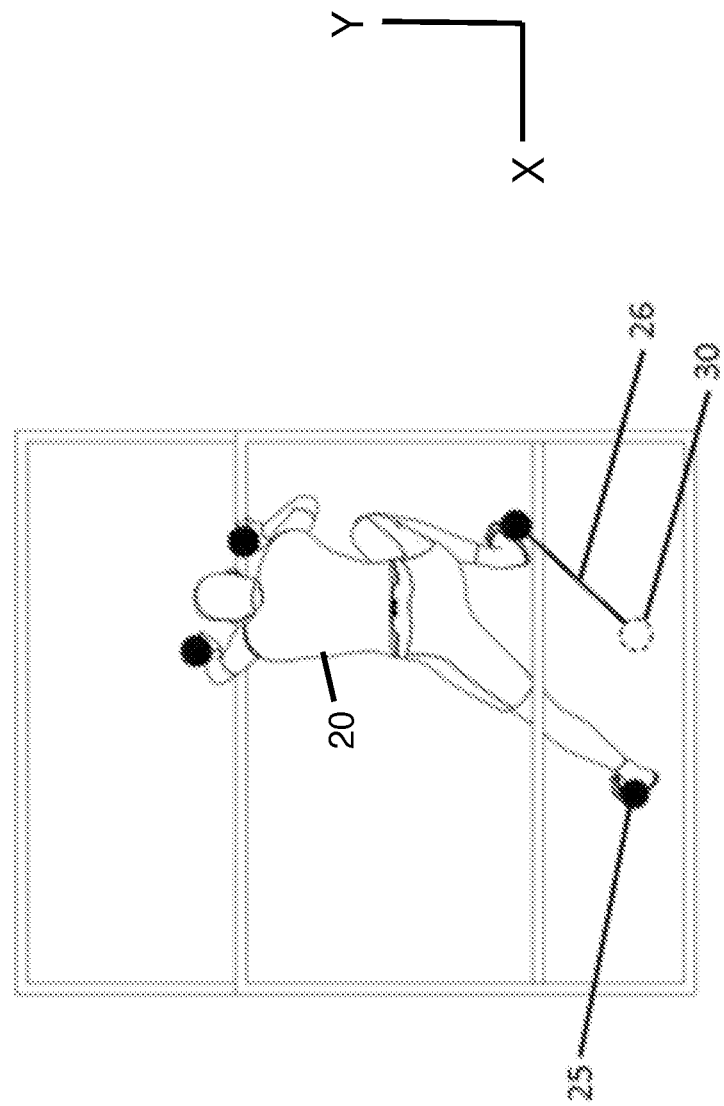

FIG. 15 shows a front view of a user 20 operating the VR apparatus and illustrates a first step in a user motion cycle. In this case, the user's hands and feet are confirmed on virtual grip points. The machine remains static, since the user's lowest foot is fixed in its neutral starting state 25. In the illustrated embodiment, the left foot end effector determines the lowest point of the user's body. The machine has calculated the motion vector 26 between the right foot end effector and its neutral starting state 30. No re-centering motion can take place until the end effector for the lowest foot lifts, indicating that an ascent motion is taking place. This movement of the lowest foot end effector can trigger the described re-centering motion.

Figure 16:
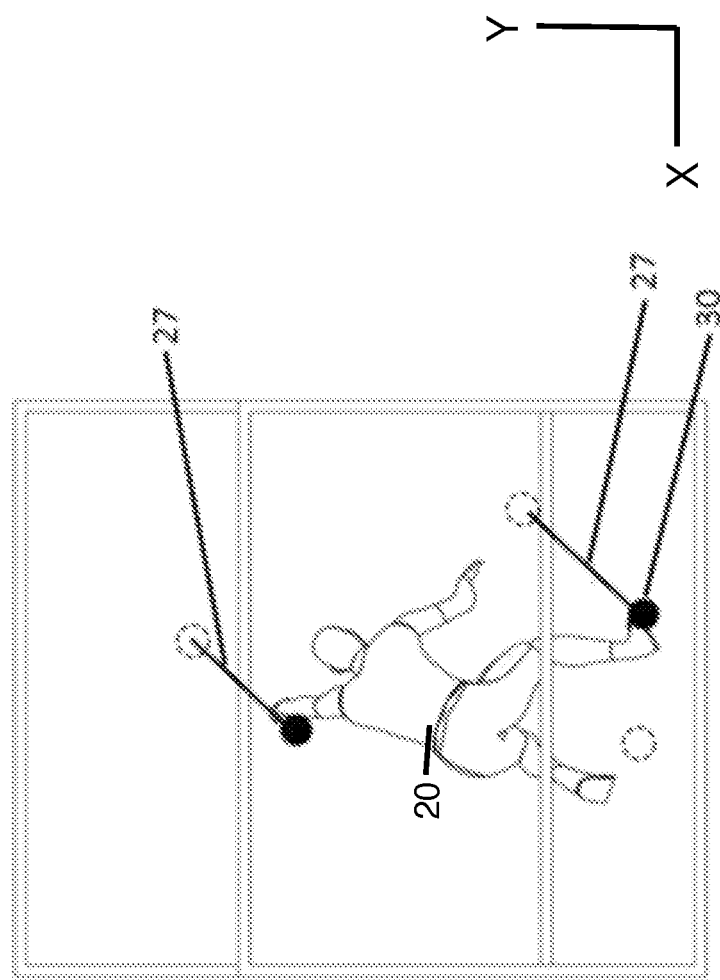
FIGS. 16-18 illustrate side views of a user's movements on an embodiment on a VR movement apparatus with a VR terrain.

With reference to FIG. 16, the user 20 has released their confirmed grip from their left foot and right hand. The left foot has lifted from its confirmed grip point, initiating the machine's re-centering motion. The remaining, fixed end effectors, the right foot and left hand re-center according to a vector 27 required to relocate the new lowest foot to the neutral starting state 30, in preparation for the next motion of the user. With the user and end effectors now centered, the user has free range of motion in all directions. Although this diagram shows the motion in two dimensions, the motion will include the Z-direction (fore-aft) motion, which allows the user to move in all upward directions before they are automatically re-centered.

Figure 17:
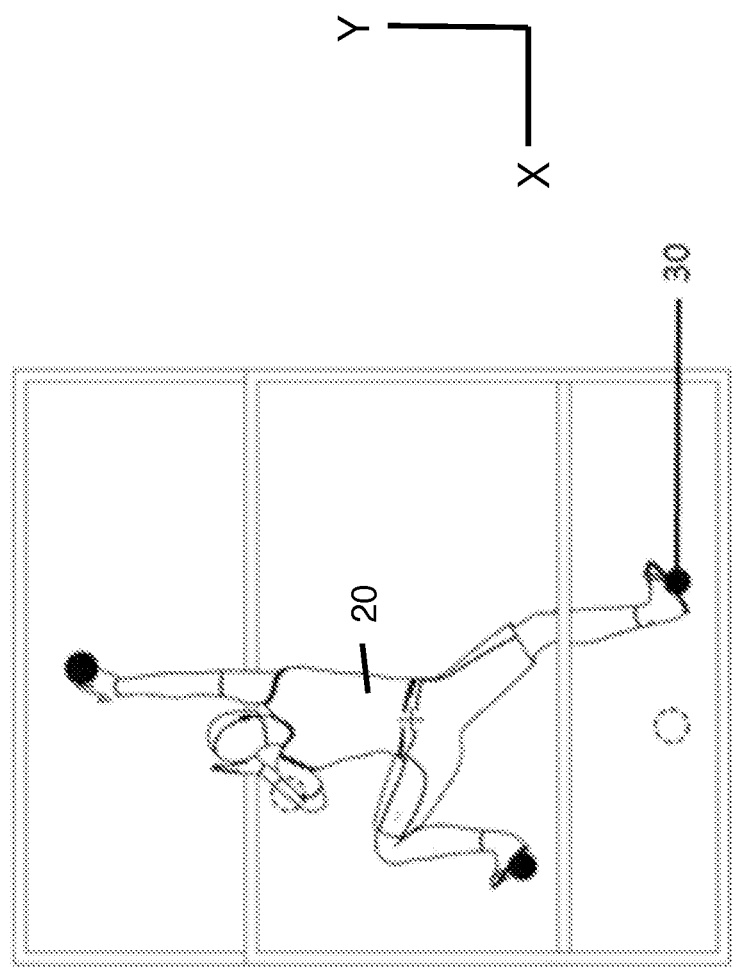

With reference to FIG. 17, the user has chosen a new, fixed position for the left foot, while the right foot remains in its neutral starting state 30. At the moment the user lifts their lowest foot, a new re-centering vector is calculated between the foot that will become the new, lowest foot and its neutral starting state 30, and the re-centering process repeats.

The inventive system can coordinate visual and haptic data that is provided to the user through a VR headset and the described haptic apparatus. In the haptic apparatus, each Cartesian motion vector (X, Y and Z) is defined by a linear bearing direction. The hardware components associated with each direction can be connected to a timing belt. Though these connections the movement of the timing belts can be activated or released as needed by commands from a microprocessor. The flat horizontal plane of motion (X and Z direction) can be controlled by electric motors. The Y direction (the vertical) movements can be controlled by an electronically computer controlled brake. In other embodiments, the Y direction can be controlled by an electric motor or any other suitable control device can be used.

Thus, when the haptic apparatus user is free to move their hand or foot unencumbered, provided that the space of the sensor embedded within the grip or foot binding remains outside the 3D, digital environment. In this way, their motion emulates the 'real world' environment, where a user is free to move hands and feet, provided they do not intersect with solid objects. If the user positions their hand or foot and therefore the positional sensor within that component within the range of an element that is designated as a 'hold' or 'grabable entity', then the mechanical components which had been moving freely now clamp firmly onto their timing belts, thereby locking them into fixed state, as if they had grabbed or otherwise intersected a solid mass. As long as downward pressure is applied to that grip, the clamps remain engaged to the timing belt. If the user lifts the hand or foot above that 'hold', then just as in the 'real world', the grip is released, the timing belts are disengaged, and the user is again free to move their hand or foot unencumbered.

The role of the software is to detect the relationship between the hand and foot interfaces and the VR surface that the user virtually interacts with. If, for example, the user 'punches' the virtual, solid mass, then the timing belt clamps engage immediately upon the virtual impact. The system can calculate timing and physical impact of intersection between the hand sensor and the virtual solid mass. As long as the hand sensor remains in such position, the hand will remain in locked state preventing further movement. If the user withdraws their hand after impact, then this motion away from a virtual object is detected, and the timing belt clamps disengage, releasing the hand back to free motion. The user can wear a VR headset with a visual display that projects a VR environment. The 3D VR environment space can be coordinated by the computer to allow the user to move in an open world VR environment while being physically confined within the frame of the VR apparatus.

In some embodiments, the VR system can use interpret specific actions of the user to transition between simulated physical contact with a virtual object and non-contact. For example, in order to 'release' a grip, the user may simply lifts their hand or foot, as they would in a real-world climbing environment to move the corresponding hand or foot interface away from the virtual object and into virtual free space. This movement by the user can provide signals to the microprocessor that the user intends to disengage that particular grip, at which time the machine releases all restrictions to motion for that limb through the VR movement apparatus controls.

Figure 18:
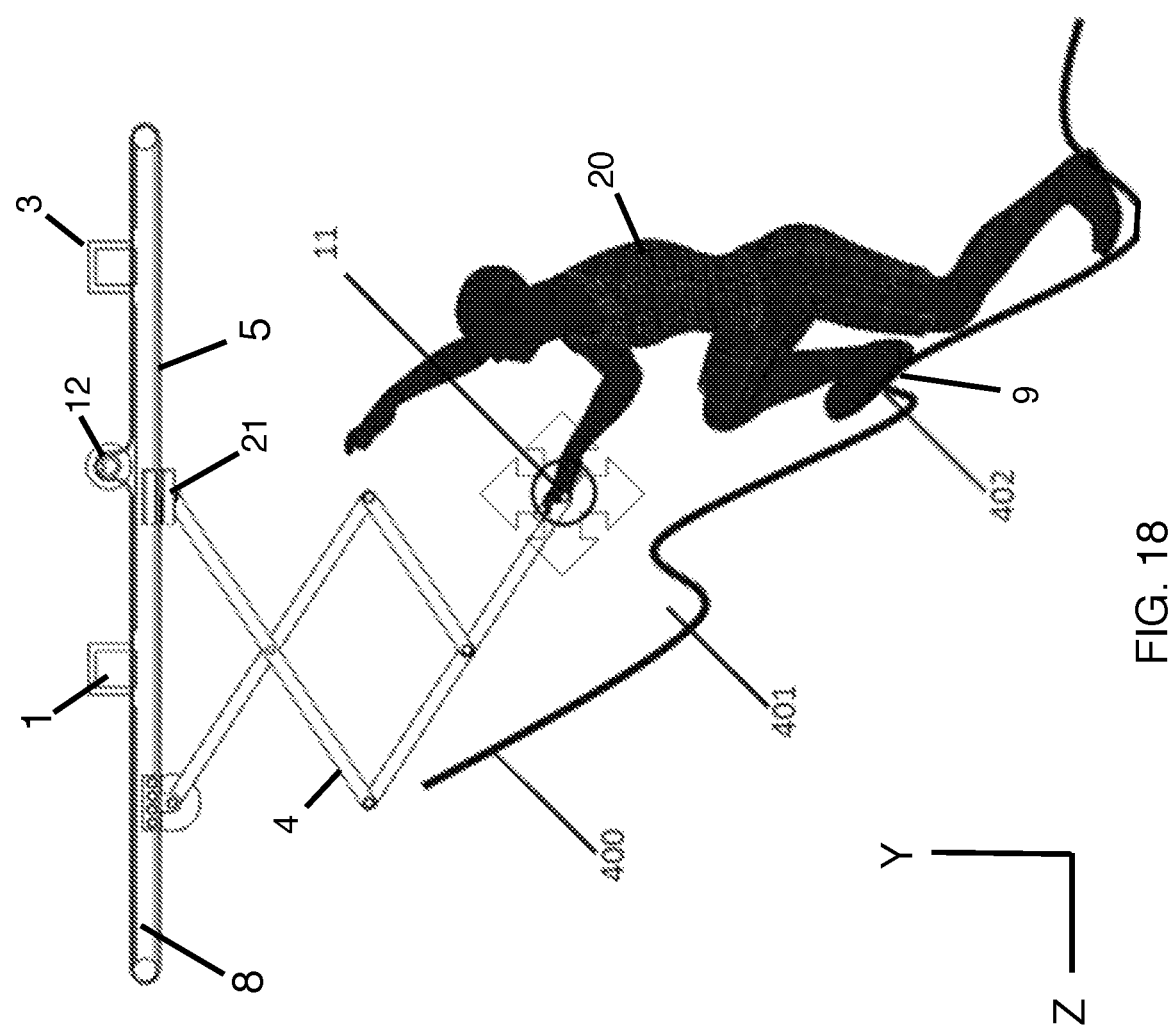

FIG. 18 shows a side view of a virtual surface 400 that a user 20 virtually interacts with. The VR software can designate a plurality of points a three dimensional space within this virtual environment as 'solid' surface or a 'not solid' open space. When the user moves the end effectors 11 in 'not solid' space, the user's hands or feet can move unencumbered in all directions. When the user moves the end effectors 11 into a 'solid' surface, the user's hands or feet can move be virtually stopped in the direction of the virtual surface. In this example, the user's foot end effector 9 intersects with a protrusion in the virtual terrain 402. This feels solid to the user, since the VR software has determined that the end effector 9 rests on a legitimately solid VR surface, a virtual protrusion in the virtual terrain 402. Therefore the VR software has restricted motion of the foot end effector 9 in the downward direction of the virtual terrain 402 relative to the end effector 9 to simulate a foothold on the virtual terrain 402. The VR software may allow the foot end effector 9 in an upward or rearward direction relative to the virtual terrain 402. However, the user's hand end effectors 11 are in not solid open space and therefore they are free to move unrestricted in any direction within the virtual open space.

Figure 19:
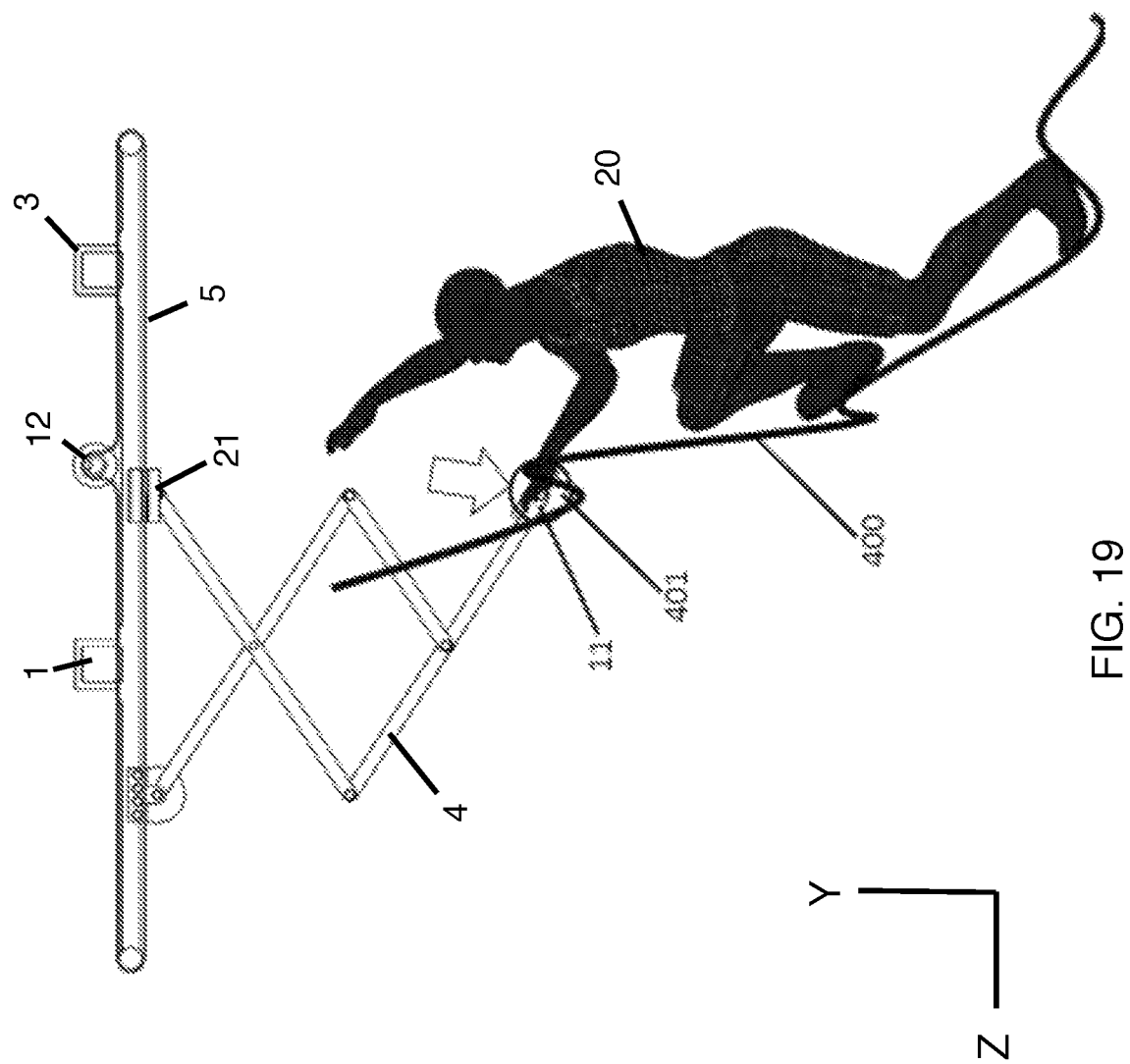
FIG. 19 illustrates an alternative embodiment of a VR movement apparatus.

With reference to FIG. 19, the user may choose to locate their hand and end effector 11 into a protrusion 401, in order to climb higher in the virtual terrain 400. The user 20 has virtually grabbed a virtual protrusion 401 in the virtual terrain 400 with a hand. The hand end effector 11 has intersected with a legitimate virtual protrusion 401 feature and performed a grabbing movement. The VR software has determined that the position of the end effector 11 is on the virtual protrusion 401. The VR software can respond to this virtual contact by restricting the movement of the end effector 11 in the downward direction of the virtual terrain 402 relative to the end effector 9. The VR software may also restrict the hand end effector 9 movements in the X and Z directions to simulate a handgrip on the virtual protrusion 401. However, the VR software may not restrict the movement of the hand end effector 9 in a vertical Y direction away from the virtual protrusion 401. Thus, the end effector 9 will no longer have complete free motion, which can provide a solid haptic feel to the user 20 to simulate a handhold of the virtual terrain 402.

Figure 20:
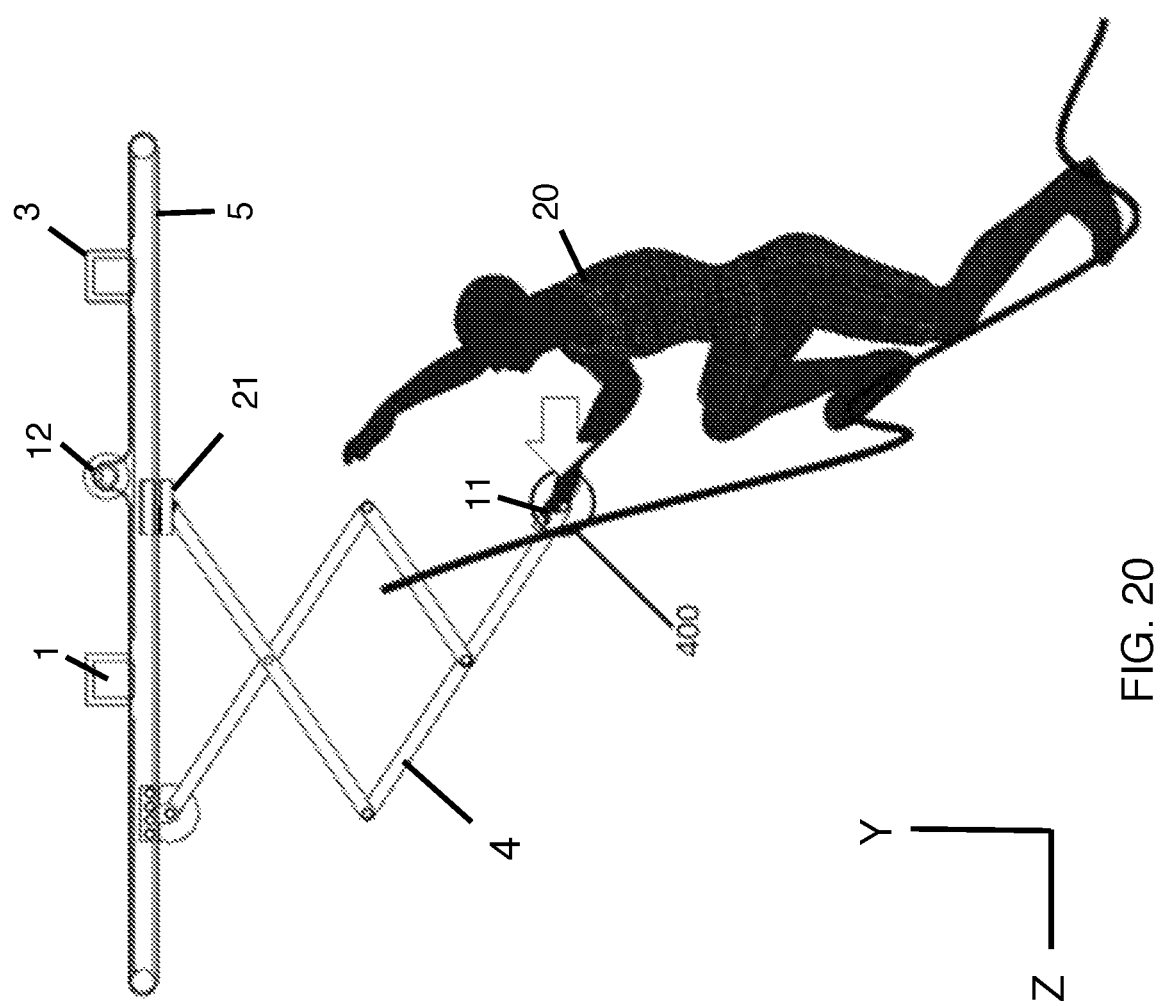
FIG. 20 illustrates a side view of a user on a VR movement apparatus.

With reference to FIG. 20, a side view of a user 20 on the movement apparatus is illustrated. The user 20 is pushing against a virtual surface 400 that has no features for grabbing. In this case, the VR software has determined that the user's hand end effector 11 intersects with the virtual surface 400, and so it restricts continued motion along that vector in the Z direction into the virtual surface 400. However, the VR software but may not restrict the movement of the hand end effector 11 in the X or Y directions because the virtual surface 400 would not restrict the movement of the hand end effector 11 in these directions. In an embodiment, force sensors can determine that the user continues to push in the Z direction towards the virtual surface 400, and the VR software can continue to restrict this continued motion into the virtual solid surface 400. If the user chooses to withdraw their hand and hand end effector 11 from the virtual surface 400 in a negative Z direction, the VR software will sense motion in the opposite direction, and will immediately allow unencumbered motion in all directions to simulate the free hand movement in open space.

In an embodiment, the VR software can simulate a friction force of a virtual hand against a virtual surface 400. While the movement in the Z direction can be restricted by the virtual surface, movement of the end effector 11 in the X and Y directions can be restricted by a simulated friction force which can be represented by the equation, Friction Force$\leq$(coefficient of friction)$\times$Normal Force. If the coefficient of friction is 0.5 and the normal force is the Z direction force of 20 pounds, then the Friction Force$\leq$10 pounds. This means that if the user exerts a force of less than 10 pounds in the X or Y directions, the end effector will not move because this X or Y direction force is less than 10 pounds. In contrast if the user exerts a force more than 10 pounds in the X or Y directions the end effector 11 will move in the direction of the force in the X or Y directions. The coefficient of friction can be variable and can depend upon the material of the virtual surface 400. A virtual surface 400 that is a slippery material such as ice will have a lower coefficient of friction than a high grip surface such as a rubber track. In an embodiment, the VR system can store multiple virtual surface 400 materials and different coefficients of friction for the different materials. The end effectors 11 can have force transducers, which measure the forces applied by the user 20 and the computer can use the coefficient of friction to calculate the friction forces to apply to the contact of the end effectors 11 with the virtual surfaces 400.

Figure 21:
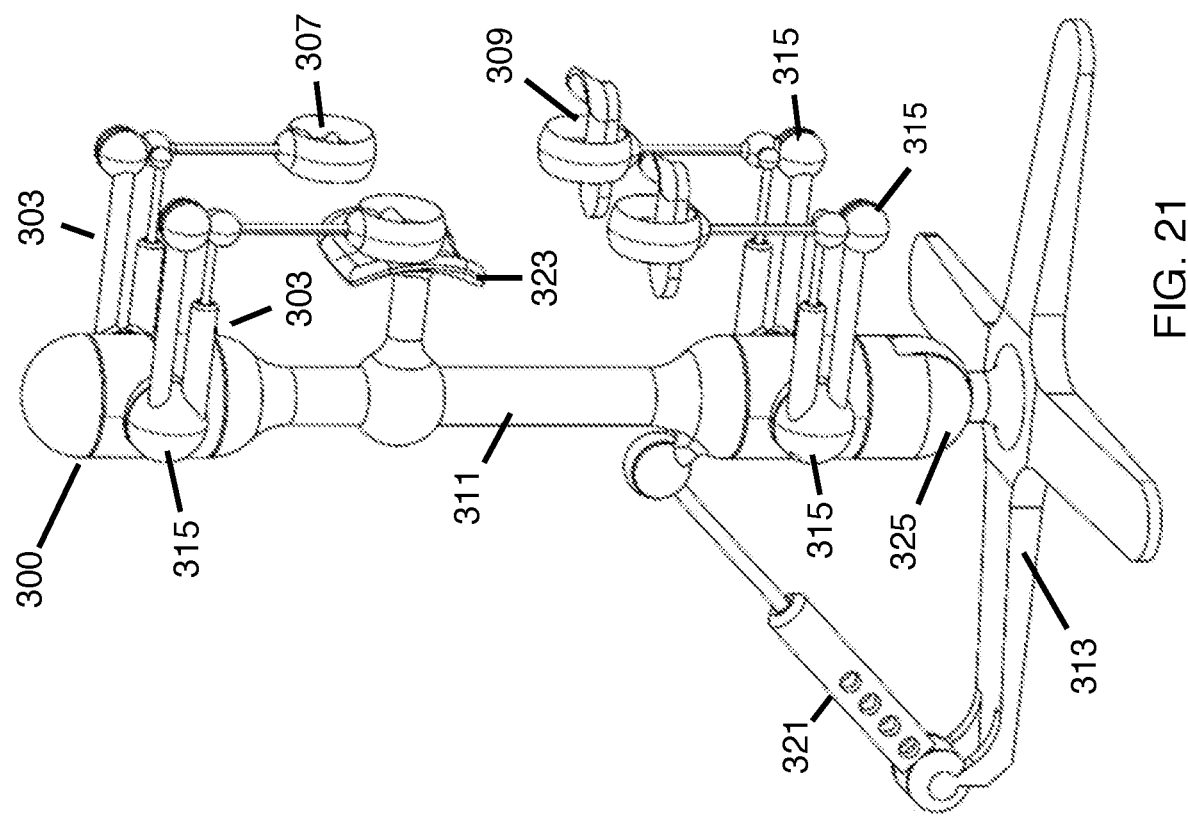
FIG. 21 illustrates a perspective view of a VR movement apparatus.

While the present invention has been described with reference to VR movement apparatus that have a frame 1 which defines a movement perimeter and is described above with reference to FIGS. 1-17, in other embodiments, other VR movement apparatus can be used with the inventive system. For example in an embodiment with reference to FIG. 21, the VR movement apparatus 300 can take the shape of a large robot that can be approximately 10 feet high with four articulated arms 303, each comprising three rotational joints at the X, Y and Z axes. Gimbal grips 307 for the hands, or foot bindings 309 on gimbals to hold the feet can be mounted to the distal ends of the arms 303. Similar gimbal grips 307 and foot bindings 309 can be used with the VR movement apparatus described above with reference to FIGS. 1-17.

To use the VR movement apparatus 300, the user steps into the foot bindings 309, and grips the hand gimbal grips 307. The user can also wear a virtual reality headset that can include a visual display and headphones placed into or over the ears to minimize outside sound and to create stereophonic, three-dimensional sound to further augment the experience.

The appearance of the VR movement apparatus 300 may comprise a central core 311 which can possibly be a cylindrical shaft that may be approximately 6 feet in length and 1 foot in diameter. The arms 303 can rotate about the central core 311, extending toward the user. The central core 311 can include another pivot 325 at the base 313, allowing the central core 311 to tilt rearward into 'prone' position by the movement of a tilt actuator 321, if the user chooses a virtual experience that is improved by lying prone (flying, swimming, etc.). In this case, a pad 323 would rest against the user's abdomen/chest (like a massage table) to steady the body, in order to isolate motion of the limbs.

The foot bindings 309 and the hand gimbal grips 307 allow the foot and hand to rotate around their ankle and wrist respectively, so that, although the hand and foot may rotate naturally, the force is translated back into the armature and overall motion. In an embodiment, the robotic arms 303 can include a motor driving each joint of the arms 303. There can be three joints 315 for each of the four arms 303 for a total of twelve joints 315. The total range of motion of each of the robotic arms 303 covers most or all of the range of motion of the corresponding human limb, allowing the user full range of motion while interacting with the VR movement apparatus 300. The motors can be integrated with the central core 311 of the VR movement apparatus 300, and coupled to the distal ends of the robotic arms 303 by drive shafts, belts or chain drives, thereby de-weighting the arm, thereby reducing the inertia caused by the arm's structure.

In an embodiment, the VR movement apparatus 300 can also include position sensors at each joint 315, thereby giving positional feedback to the CPU for each motion and location. Force sensors may also exist at each joint 315, enabling accurate control of the amount of force that can be applied to each motion path. These also accumulate data on the total amount of force given by the user, in order to determine the quality of their workout and the progress of their treatment.

In an exercise application, this user movement and force data can be sent to approved caregivers, in order to allow compliance monitoring, and to improve the quality of care. Because the VR environment is controlled by a computer processor, the 'Motion Environment' can function independently of an 'overlay', to allow the same workout (or physical therapy) to be offered to users with different VR tastes. Physical therapy motion paths to rehabilitation after hip replacement surgery, for example, may be overlaid with a VR environment that can simulate walking in a Tuscan hill-town for one, or storming Normandy for another, since different virtual experiences may be overlaid at will.

In another embodiment, the four-arm, articulated VR movement apparatus 300 can be used without motors. Instead, each of the 12 main joints 315 can be use with an electronically-activated clutch to engage, disengage, or precisely vary the amount of resistance at any vector of the arms 303 and connected linkages. In this way, the user would feel the force feedback, for example, when their hand 'touched' a table, since that motion direction would be denied by the engaging of the clutch to stop motion in that particular direction. A combination of clutch engagements (X, Y and Z) would result in the simulation of a physical surrounding.

In another embodiment, the foot bindings 309 and the hand gimbal grips 307 can each contain electromagnetic clutches at each pivot or joint 316 that can allow the VR software to control the VR movement apparatus 300. Depending up the VR environment being simulated, the VR software can allow free motion, stop all motion, or adjust the resistive force of the motion for each of the foot bindings 309 and the hand gimbal grips 307. This improves the quality of the simulation, for example, if a user chooses to 'virtually climb' the Eiffel Tower, the handgrips should suggest that they are gripping a solid, stationary object. In this case, the VR software would deny motion of the gimbal at the grip to improve the illusion. As the arms 303 of the VR movement apparatus 300 can move in sync with the climbing motion of the user, the grip would release pressure in a regulated manner so that the grip would move along with the motion that the user might expect.

In an embodiment, the inventive systems can be used with virtual gaming systems where users can wear VR headsets, where the player's eyes are focused on stereoscopic projections of a single environment, can provide visual images that provide a sense of transposition in a computer generated 3D virtual environment. These VR systems can effectively trick the eyes of a system user into believing that a transformation has taken place. Other VR systems can instead or additionally create a simulated immersive environment, where the user may turn their head in any direction, as one would in the 'real' world, further enhancing the sense of a virtual reality. However, this visual VR effect can be limited to the eyes, since the VR system only includes a headset that covers the eyes. These headsets used with the VR systems may only provide a limited overall sense of transposition, since the reality seen by the eyes often contradicts what should be felt by the hands and feet of the user. The inventive VR system overcomes these issues by coordinating the haptic senses with the visual senses in a VR environment. Coordinated motion of the four armatures may be used to create effects within the experience. The armatures may suddenly create a rapid descent, momentarily simulating the weightlessness that the user would feel in a real-world free-fall.

In different embodiments, the VR systems can be used for other applications including exercise. The obesity epidemic facing the US and beyond often points back to the sedentary lifestyle. Minimal exercise is required to maintain decent health, though a gym environment which may be the only option for many in bad weather locations can be less than compelling to many who are most in need of exercise. As discussed, the VR system can be a possible exercise apparatus, which can more enjoyable, more private and adjustable to the needs of the user.

Because the VR movement apparatus can be tuned to the specific needs of the user, it can be useful for physical therapy (PT). If undertaken for the correctly prescribed amount of PT exercise, will often rehabilitate a patient recovering from a medical intervention. But this PT treatment can be tedious and laborious, and is often dismissed by patients who may need to do PT alone. This, in effect, undermines the efficiency of the treatment. Physical Therapy often must be done with accurate, limited and deliberate motion (direction and range), and with specific force pressures correlated to the progress of the treatment. A PT would ideally prefer to prescribe a course of treatment with exact specifications, and closely monitor the results and progress. The VR movement apparatus can run VR software which can require a specific type of exercise and body movement, monitor the force feedback to insure compliance with a PT exercise schedule, store and forward the patient data to a physical therapist and doctors.

Both physical therapy and personal training base their success upon compliance and progress monitoring. Currently, the physical therapists and personal trainers outline a course of action for their patients and clients, assuming that they will receive honest and accurate progress reports from the patients and clients. The reality of this may vary greatly. For best results, the physical therapists and personal trainers could watch the progress remotely, and adjust the course of treatment as needed. The VR movement apparatus can run physical therapy or personal training software which can require a specific type of exercise and body movement, monitor the force feedback to insure compliance with a PT exercise schedule, store and forward the patient data to a physical therapist and doctors.

In different embodiments, the VR movement apparatus 100, 300, 505 can be used for various other applications. For example, Spinal Cord Injury (SCI) patients who require wheelchairs for motion must have professional physical therapy in order to allow regular motion to their limbs. This is costly, and requires dependence on another person for simply moving the legs. In an embodiment, the VR movement apparatus 300 can be used to exercise the patient's legs only. Additionally, for this population, a source of escapism and sense of physical freedom offers a quality of life improvement.

In some embodiments, the VR movement apparatus 100, 300, 505 can be used for other health issues. Obesity remains a major health concern for the world. Children now grow up playing video games, sedentary, for long hours. This is a primary cause of Type II Diabetes, heart issues, digestive issues, and, ultimately, limb loss. Children often prefer video games over gyms, playgrounds, fields and other physical outdoor activities. They need a source of exercise that, in their perception, is a video game. Ideally, this 'video game' is more compelling than what can be found at home, giving them a reason to immerse in a greater experience. In an embodiment, the VR movement apparatus 100, 300, 505 can be used with video game VR software that can be designed to be entertaining to the children and may simulate outdoor physical activity.

People with different personalities may be motivated to physical activity by different forms of motivation. While one person may be inspired by competition, another may choose escapism, and another chooses instead physical training or learning new skills. Current gym equipment does not respond to individual interests or inspirations. Equipment that could deliver user-tailored workout environment experiences would likely motivate a new range of people to enjoy the benefits of physical fitness.

The proposed invention allows the user free range of motion, while giving the force feedback of physical contact with a virtual environment. The users may choose where to locate their handholds and footholds as they climb, inviting them to explore however they choose. Because the virtual environment is created by computer, it may be scaled or adapted to the needs of each user.

Figure 22:
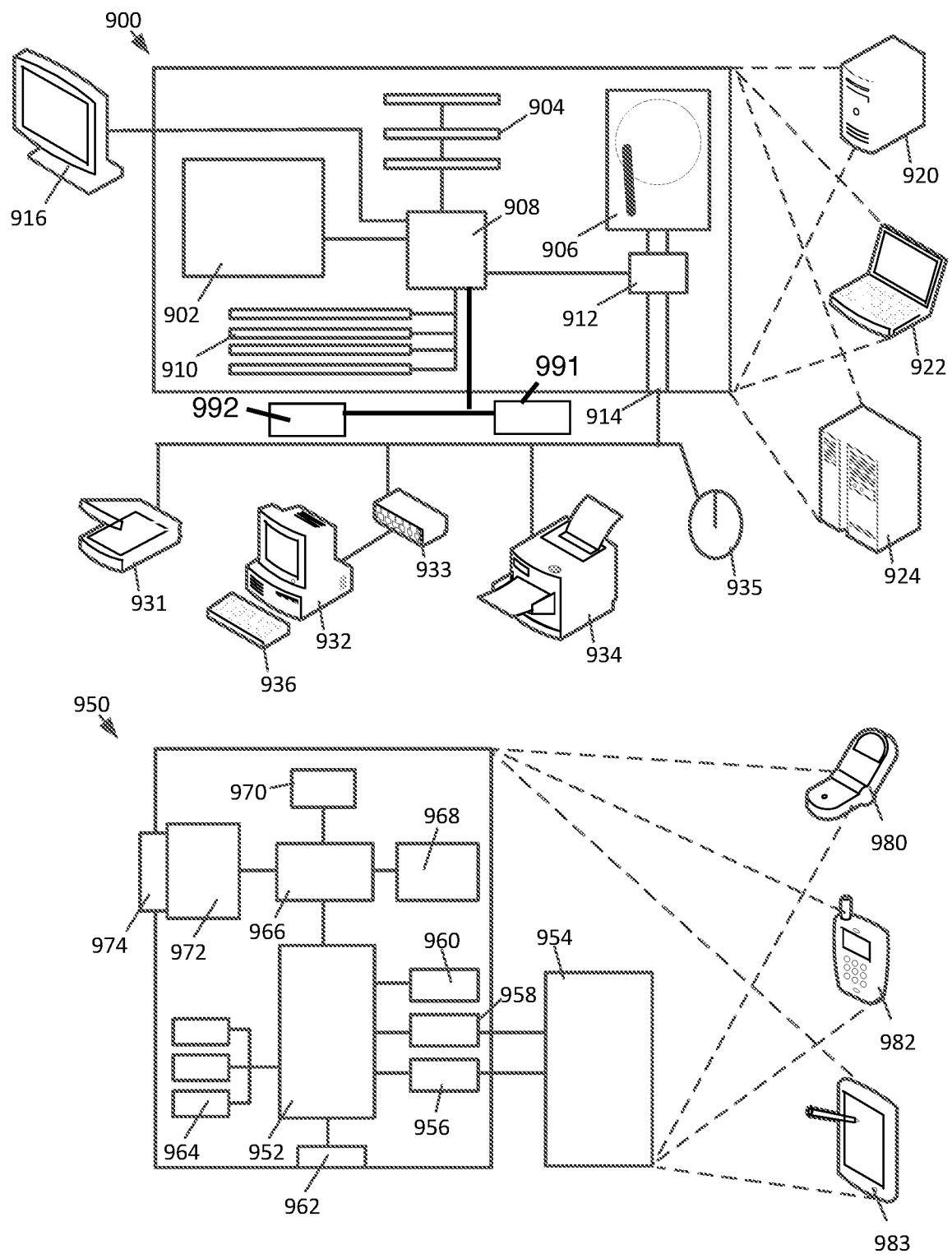
FIG. 22 illustrates an embodiment of a computer system used with a VR system.

FIG. 22 shows an example of a generic computer device 900 and a generic mobile computer device 950, which may be used to implement the processes described herein, including the mobile-side and server-side processes for installing a computer program from a mobile device to a computer. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter. In the illustrated example, the high speed controller 908 can be coupled to a visual display 992 which can display a visual VR environment generated by the processor 952. The visual display 992 can be part of a VR headset worn by a user of the described VR system. The external interface 962 can also be coupled to the VR movement apparatus which can provide haptic VR environments which are coordinated and synchronously output with visual VR environments as described above.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used. The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A virtual reality (VR) apparatus comprising:
    a movement apparatus for providing a haptic VR environment, the movement apparatus comprising:
        a frame with an internal volume that defines a movement perimeter;
        an upper left assembly coupled to an upper portion of the frame having a left hand interface;
        an upper right assembly coupled to an upper portion of the frame having a right hand interface;
        a lower left assembly coupled to a lower portion of the frame having a left foot interface;
        a lower right assembly coupled to a lower portion of the frame having a right foot interface; and
        a plurality of actuators coupled to the upper left assembly, the upper right assembly, the lower left assembly and the lower right assembly for providing haptic resistance to movements of the left hand interface, the right hand interface, the left foot interface and the right foot interface, wherein the left hand interface, the right hand interface, the left foot interface and the right foot interface move inside the movement perimeter of the frame, and the upper left assembly, the upper right assembly, the lower left assembly and the lower right assembly each include a vertical motor that controls vertical movements of the left hand interface, the right hand interface, the left foot interface and the right foot interface;
    a visual display for displaying a visual VR environment;
    a computer processor running a VR program for providing a VR environment and coordinating haptic VR environment data transmitted to the movement apparatus with visual VR environment data transmitted to the visual display.

2. The VR apparatus of claim 1 wherein the upper left assembly, the upper right assembly, the lower left assembly and the lower right assembly each include an armature assembly that move the left hand interface, the right hand interface, the left foot interface and the right foot interface in a vertical Y direction.

3. The VR apparatus of claim 1 wherein the VR program simulates user movement and re-centers a user of the VR apparatus by moving the left hand interface, the right hand interface, the left foot interface and the right foot interface in the same relative positions to each other after the left hand interface, the right hand interface, the left foot interface and after the right foot interface are moved away from centered positions.

4. The VR apparatus of claim 1 wherein the upper left assembly, the upper right assembly, the lower left assembly and the lower right assembly each include a X direction motor and a Z direction motor wherein the X direction motors and the Z direction motors control horizontal movements of the left hand interface, the right hand interface, the left foot interface and the right foot interface.

5. The VR apparatus of claim 1 wherein the left foot interface and the right foot interface include platforms and coupling mechanisms, adapted for supporting the feet of a user.

6. The VR apparatus of claim 1 wherein the left hand interface and the right hand interface include platforms and coupling mechanisms that are adapted for supporting the hands of a user.

7. The VR apparatus of claim 1 wherein the left hand interface and the right hand interface include gimbals that are adapted for supporting the hands of a user and allowing rotation of the hands.

8. The VR apparatus of claim 1 further comprising:
    a plurality of motors that control the movement of the plurality of actuators, the plurality of motors are controlled by the computer processor.

9. The VR apparatus of claim 1 wherein the VR program for providing the VR environment includes topographical simulation data that includes visual topography data for display on the visual display and haptic topography data that includes solid surfaces, the computer processor controls the haptic apparatus to prevent the left hand interface, the right hand interface, the left foot interface and the right foot interface from moving through the solid surfaces defined by the haptic topography data.

10. The VR apparatus of claim 9 wherein the computer processor determines a coefficient of friction based upon gravity and surface material of the solid surfaces when the left hand interface, the right hand interface, the left foot interface, or the right foot interface contact the solid surfaces of the haptic topography data.

11. The VR apparatus of claim 9 wherein the computer processor determines a sliding direction over the solid surfaces when the left hand interface, the right hand interface, the left foot interface, or the right foot interface slides on the solid surfaces of the haptic topography data.

12. A virtual reality (VR) apparatus comprising:
a movement apparatus for providing a haptic VR environment, the movement apparatus comprising:
a frame with an internal volume that defines a movement perimeter;
an upper left assembly coupled to an upper portion of the frame having a left hand interface;
an upper right assembly coupled to an upper portion of the frame having a right hand interface;
a lower left assembly coupled to a lower portion of the frame having a left foot interface;
a lower right assembly coupled to a lower portion of the frame having a right foot interface; and
a plurality of actuators coupled to the upper left assembly, the upper right assembly, the lower left assembly and the lower right assembly for providing haptic resistance to movements of the left hand interface, the right hand interface, the left foot interface and the right foot interface, wherein the left hand interface, the right hand interface, the left foot interface and the right foot interface move within the movement perimeter of the frame, and the upper left assembly, the upper right assembly, the lower left assembly and the lower right assembly each include a vertical motor that controls vertical movements of the left hand interface, the right hand interface, the left foot interface and the right foot interface;
a visual display for displaying a visual VR environment;
a computer processor running a VR program for providing the visual VR environment and haptic VR environment data that is transmitted to the movement apparatus and coordinated with visual VR environment data, wherein the VR program re-centers a user of the VR apparatus by moving the positions of the left hand interface, the right hand interface, the left foot interface and the right foot interface and synchronously re-centers the visual VR environment.

13. The VR apparatus of claim 12 wherein the VR program re-centers the positions of the left hand interface, the right hand interface, the left foot interface and the right foot interface after the left hand interface, the right hand interface, the left foot interface and after the right foot interface are moved away from centered positions.

14. The VR apparatus of claim 12 wherein the VR program re-centers the positions of the left hand interface, the right hand interface, the left foot interface and the right foot interface after the left hand interface, the right hand interface, the left foot interface and the right foot interface are moved within a predefined distance from the movement perimeter.

15. The VR apparatus of claim 12 wherein the movement apparatus simulates an ascent movement and constantly re-centers a user, by moving the left hand interface, the right hand interface, the left foot interface and the right foot interface in a coordinated, simultaneous fashion toward the physical center of the movement apparatus.

16. The VR apparatus of claim 12 wherein re-centering motions of the left hand interface, the right hand interface, the left foot interface and the right foot interface in X, Y and Z directions accelerates from standstill at the beginning of the re-centering motions and then decelerating at the end of the re-centering motions.

17. The VR apparatus of claim 12 wherein the visual VR environment and the haptic VR environment data provided by the VR program simulates climbing at an angle, while a center point of the left hand interface, the right hand interface, the left foot interface and the right foot interface remains generally stationary and centered within the movement perimeter of the VR apparatus.

18. The VR apparatus of claim 12 wherein the visual VR environment and the haptic VR environment data provided by the VR program simulates virtual grab structures that may grabbed by grab movements of the left hand interface, the right hand interface, the left foot interface, or the right foot interface, wherein the left hand interface, the right hand interface, the left foot interface, or the right foot interface is virtually coupled to the virtual grab structures.

19. The VR apparatus of claim 18 wherein the VR program simulates virtual grab structures that may released by release movements of the left hand interface, the right hand interface, the left foot interface, or the right foot interface wherein the left hand interface, the right hand interface, the left foot interface, or the right foot interface is virtually released from the virtual grab structures.

20. The VR apparatus of claim 12 wherein the VR program simulates virtual falling when the left hand interface, the right hand interface, the left foot interface, and the right foot interface are not in contact with any virtual structures, wherein the left hand interface, the right hand interface, the left foot interface, or the right foot interface move in a gravitational direction simultaneously.

21. A virtual reality (VR) apparatus comprising:
a movement apparatus for providing a haptic VR environment, the movement apparatus comprising:
an upper left assembly having a left hand interface;
an upper right assembly having a right hand interface;
a lower left assembly having a left foot interface;
a lower right assembly having a right foot interface; and
a plurality of actuators coupled to the upper left assembly, the upper right assembly, the lower left assembly and the lower right assembly for providing haptic resistance to movements of the left hand interface, the right hand interface, the left foot interface and the right foot interface, wherein the left hand interface, the right hand interface, the left foot interface and the right foot interface move in movement perimeter of the frame, and the upper left assembly, the upper right assembly, the lower left assembly and the lower right assembly each include a vertical motor that controls vertical movements of the left hand interface, the right hand interface, the left foot interface and the right foot interface;
a visual display for displaying a visual VR environment;
a computer processor running a VR program for providing a VR environment and coordinating haptic VR environment data transmitted to the movement apparatus with visual VR environment data transmitted to the visual display.

22. The VR apparatus of claim 21 wherein the upper left assembly, the upper right assembly, the lower left assembly and the lower right assembly each include a vertical actuator that moves the left hand interface, the right hand interface, the left foot interface and the right foot interface in a vertical Y direction.

23. The VR apparatus of claim 21 wherein the left foot interface and the right foot interface include platforms and coupling mechanisms, adapted for supporting the feet of a user.

24. The VR apparatus of claim 21 wherein the left hand interface and the right hand interface include platforms and coupling mechanisms that are adapted for supporting the hands of a user.

25. The VR apparatus of claim 21 wherein the left hand interface and the right hand interface include gimbals that are adapted for supporting the hands of a user and allowing rotation of the hands.

26. The VR apparatus of claim 21 further comprising:
a plurality of motors that control the movement of the plurality of actuators, the plurality of motors are controlled by the computer processor.

27. The VR apparatus of claim 21 wherein the VR program for providing the VR environment includes topographical simulation data that includes visual topography data for display on the visual display and haptic topography data that includes solid surfaces, the computer processor controls the haptic apparatus to prevent the left hand interface, the right hand interface, the left foot interface and the right foot interface from moving through the solid surfaces defined by the haptic topography data.

28. The VR apparatus of claim 27 wherein the computer processor determines a coefficient of friction based upon gravity and surface material of the solid surfaces when the left hand interface, the right hand interface, the left foot interface, or the right foot interface contact the solid surfaces of the haptic topography data.

29. The VR apparatus of claim 27 wherein the computer processor determines a sliding direction over the solid surfaces when the left hand interface, the right hand interface, the left foot interface, or the right foot interface slides on the solid surfaces of the haptic topography data.

* * * * *